US011062326B2

(12) United States Patent
Bucher et al.

(10) Patent No.: US 11,062,326 B2
(45) Date of Patent: Jul. 13, 2021

(54) COMPLIANCE MANAGEMENT TECHNIQUES

(71) Applicants: John Richard Bucher, Salt Lake City, UT (US); Bryan J. Christiansen, Eagle Mountain, UT (US)

(72) Inventors: John Richard Bucher, Salt Lake City, UT (US); Bryan J. Christiansen, Eagle Mountain, UT (US)

( * ) Notice: Subject to any disclaimer, the term of this patent is extended or adjusted under 35 U.S.C. 154(b) by 513 days.

(21) Appl. No.: 14/679,530

(22) Filed: Apr. 6, 2015

(65) Prior Publication Data

US 2015/0287044 A1 Oct. 8, 2015

Related U.S. Application Data

(60) Provisional application No. 61/975,916, filed on Apr. 7, 2014.

(51) Int. Cl.
*G06Q 30/00* (2012.01)
*G06Q 10/10* (2012.01)

(52) U.S. Cl.
CPC ....... *G06Q 30/018* (2013.01); *G06Q 10/1093* (2013.01)

(58) Field of Classification Search
CPC . G06F 3/0481; G06Q 30/018; G06Q 10/1093
USPC ......... 348/135; 382/141, 152; 705/306, 317, 705/342; 715/764, 864
See application file for complete search history.

(56) References Cited

U.S. PATENT DOCUMENTS

| 8,311,853 | B1* | 11/2012 | Pankow | G06Q 10/00 705/2 |
| 10,275,776 | B1* | 4/2019 | Watson | G06F 8/60 |
| 2003/0069983 | A1* | 4/2003 | Mukund | G06Q 10/109 709/229 |
| 2005/0071185 | A1* | 3/2005 | Thompson | G06Q 10/10 705/317 |
| 2005/0228688 | A1* | 10/2005 | Visser | G06Q 10/10 340/691.3 |
| 2006/0136922 | A1* | 6/2006 | Zimberg | G06Q 10/06 718/100 |
| 2006/0149416 | A1* | 7/2006 | Mohapatra | G06F 19/3456 700/242 |
| 2008/0059276 | A1* | 3/2008 | Menon | G06Q 10/06 705/7.22 |

(Continued)

OTHER PUBLICATIONS

Thakar. Important Changes to PCI Scan Compliance—Sep. 1 Deadline. Qualys.com. Sep. 1, 2010. [Retrieved on: Aug. 8, 2018]. Retrieved from internet: <URL:https://blog.qualys.com/technology/2010/09/01/important-changes-to-pci-scan-compliance-sept-1st-deadline>. entire document (Year: 2010).*

(Continued)

*Primary Examiner* — Richard W. Crandall
*Assistant Examiner* — Corey Russ
(74) *Attorney, Agent, or Firm* — John Richard Bucher; TechLaw Ventures, PLLC

(57) ABSTRACT

This patent application relates to compliance management techniques for interactively managing an entity's compliance. Entities can remain compliant by utilizing an interactive compliance status dashboard and other compliance tools that allow the entity's current compliance status can be interactively tracked and presented via the dashboard.

17 Claims, 12 Drawing Sheets

(56) References Cited

U.S. PATENT DOCUMENTS

| | | | |
|---|---|---|---|
| 2009/0043633 A1* | 2/2009 | Nadas | G06Q 50/00 705/7.15 |
| 2010/0057512 A1* | 3/2010 | Tays | G06F 40/174 705/7.15 |
| 2010/0250313 A1* | 9/2010 | Crocker | G06Q 10/06395 705/7.41 |
| 2011/0040572 A1* | 2/2011 | Chmiel | A61B 5/0002 705/2 |
| 2011/0054968 A1* | 3/2011 | Galaviz | G06Q 10/06 705/7.28 |
| 2011/0208662 A1* | 8/2011 | Haunschild | G06Q 10/10 705/317 |
| 2011/0281246 A1* | 11/2011 | Brunacini | G09B 7/06 434/219 |
| 2012/0241043 A1* | 9/2012 | Perazzo | A61J 7/0053 141/2 |
| 2012/0310700 A1* | 12/2012 | Kurtz | G06Q 40/08 705/7.28 |
| 2013/0110555 A1* | 5/2013 | Dunham | G06Q 40/08 705/4 |
| 2013/0185108 A1* | 7/2013 | Bainbridge | G06Q 10/10 705/7.15 |
| 2014/0055625 A1* | 2/2014 | Smith | G06Q 10/00 348/207.1 |
| 2014/0101437 A1* | 4/2014 | Kube | H04L 63/102 713/155 |
| 2015/0242862 A1* | 8/2015 | Rupple | G06Q 30/018 705/317 |
| 2018/0280245 A1* | 10/2018 | Khalid | G16H 20/10 |

OTHER PUBLICATIONS

Hepp, Martin, et al. "Semantic business process management: A vision towards using semantic web services for business process management." IEEE International Conference on e-Business Engineering (ICEBE'05). IEEE, 2005. (Year: 2005).*

Sadiq, Shazia, Guido Governatori, and Kioumars Namiri. "Modeling control objectives for business process compliance." International conference on business process management. Springer, Berlin, Heidelberg, 2007. (Year: 2007).*

\* cited by examiner

US 11,062,326 B2

1

COMPLIANCE MANAGEMENT TECHNIQUES

CROSS REFERENCE TO RELATED APPLICATION

This application claims the benefit of U.S. Provisional Application No. 61/975,916 filed Apr. 7, 2014.

BACKGROUND

Compliance requirements continue to increase and become more complex. Entities subject to these requirements are under tremendous pressure to maintain full compliance, and many of these entities continue to struggle with managing these requirements. Current compliance resources, however, do not provide for a sufficiently robust or comprehensive compliance solution.

SUMMARY

Compliance management techniques are described for interactively managing an entity's compliance with applicable compliance requirements (i.e., requirements). These requirements may be represented in policies, procedures, statutes, rules, standards, practice guidelines, and/or other types of compliance sources applicable to a regulated entity (i.e. an entity), such as an individual, business, company, agency, etc.

By utilizing these techniques, entities can remain compliant by providing their leaders, employees, staff, agents, and/or other responsible and/or concerned individuals with compliance tools that allow them to be informed about relevant compliance-related activities, as identified in compliance-related task (CRT) instances. For example, these individuals can be kept up to date with respect to what instances need to be completed, when each such instances needs to be completed, whether each such instances has been completed, and the documentation (or lack thereof) of each such instance's completion.

In at least one embodiment, an entity's current compliance status can be interactively tracked and presented via an interactive compliance status dashboard (ICSD). Individual user interactions can be received via the ICSD. For example, the user can be interactively guided through the completion of one or more CRT instances that represent actions that are necessary for the entity to remain compliant. These CRT instances can be based on tasks that are kept up-to-date with respect to current compliance sources. In response, the entity's current compliance status can be updated. Each of the user interactions and the update can be fully documented to provide a robust audit trail.

BRIEF DESCRIPTION OF THE DRAWINGS

The accompanying drawings illustrate implementations of the concepts conveyed in the present application. Features of the illustrated embodiments can be more readily understood by reference to the following description taken in conjunction with the accompanying drawings. Like reference numbers in the various drawings are used wherever feasible to indicate like elements.

2

Figure 12:
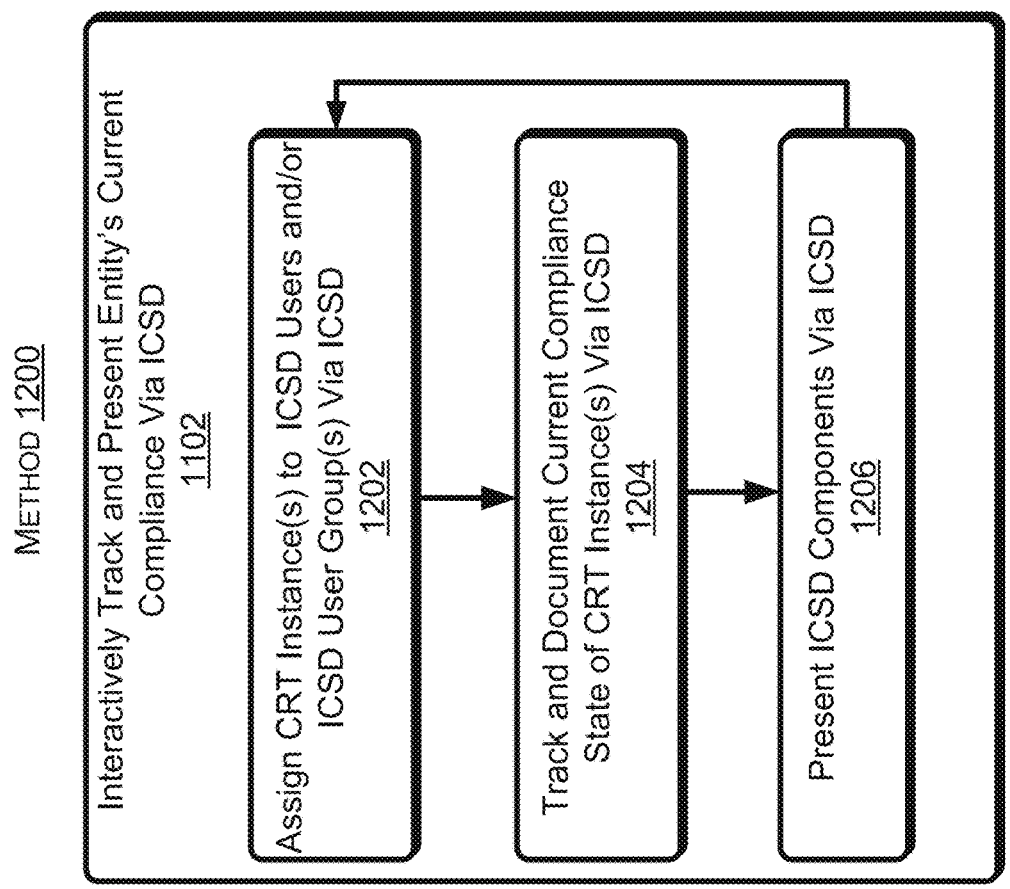
Figure 11:
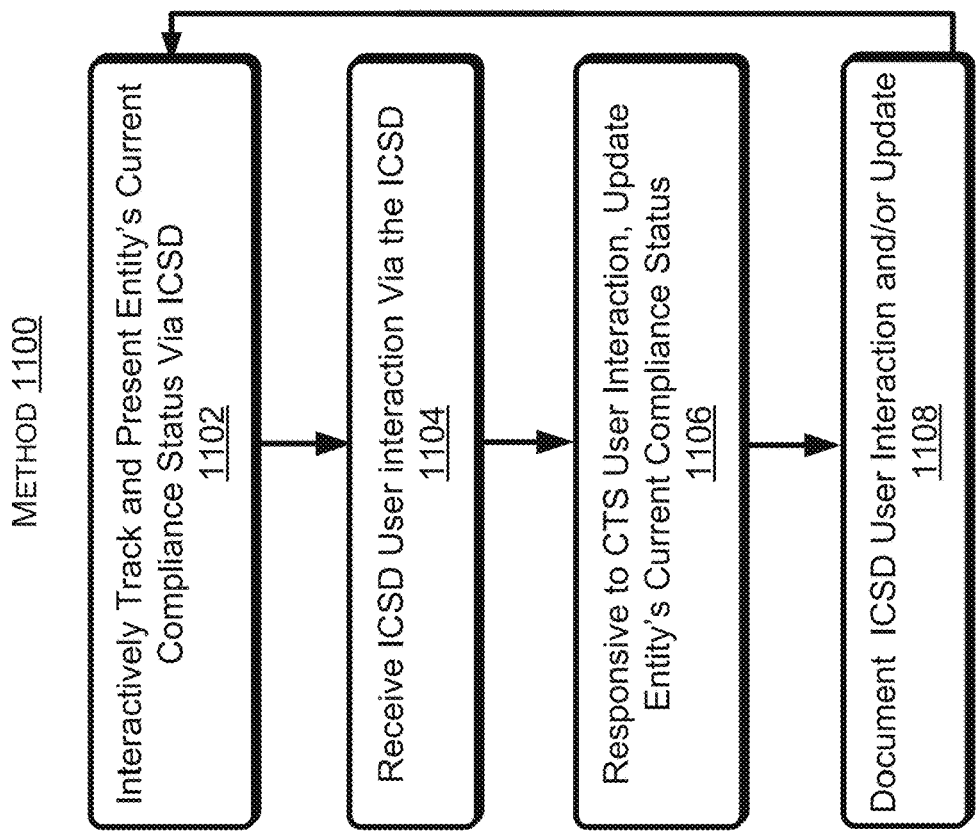

FIGS. 11 and 12 each illustrate a flowchart of an example process, technique, or method that may be implemented, in accordance with at least one embodiment.

Figure 13:
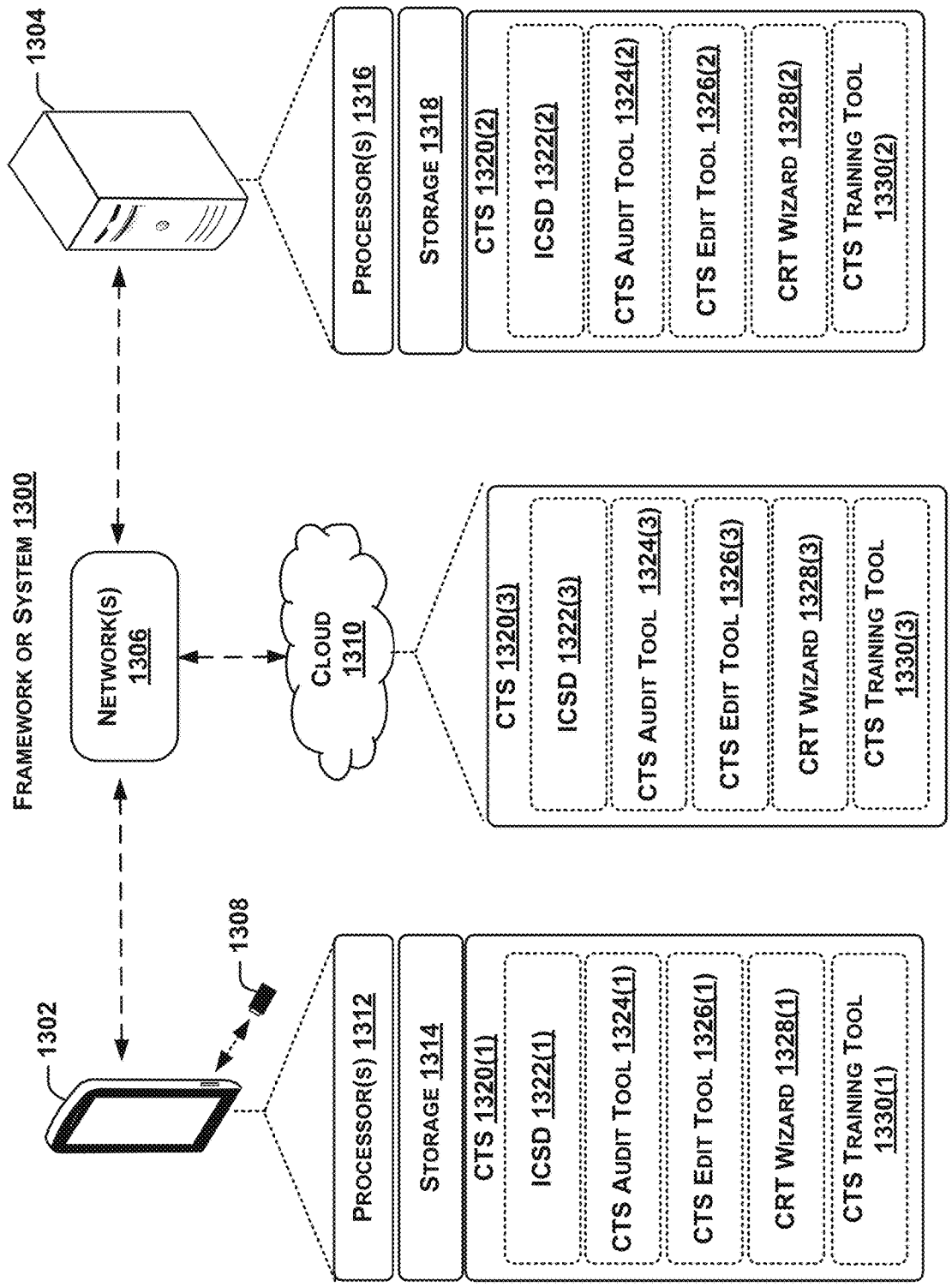

FIG. 13 illustrates an example framework or system in which the described techniques and embodiments may be implemented, in accordance with at least one embodiment.

DETAILED DESCRIPTION

Overview

Compliance management techniques are described for interactively managing an entity's compliance with applicable compliance requirements (i.e., requirements). These requirements may be represented in policies, procedures, statutes, rules, standards, practice guidelines, and/or other types of compliance sources applicable to a regulated entity (i.e. entity), such as an individual, business, company, agency, etc.

By utilizing these techniques, entities can remain compliant by providing their leaders, employees, staff, agents, and/or other responsible and/or concerned individuals with compliance tools that allow them to be informed about relevant compliance-related activities, or tasks. For example, these individuals can be kept up to date with respect to what instances need to be completed, when each such instances needs to be completed, whether each such instances has been completed, and the documentation (or lack thereof) of each such instance's completion.

In at least one embodiment, an entity's current compliance status can be interactively tracked and presented via an interactive compliance status dashboard (ICSD). Individual user interactions can be received via the ICSD. For example, the user can be interactively guided through the completion of one or more CRT instances that represent actions that are necessary for the entity to remain compliant. These instances can be based on tasks that are kept up-to-date with respect to current compliance sources. In response, the entity's current compliance status can be updated. Each of the user interactions and the update can be fully documented to provide a robust audit trail.

Multiple and varied implementations are described herein. Generally, any of the features/functions described with reference to the figures can be implemented using software, hardware, firmware (e.g., fixed logic circuitry), manual processing, or any combination thereof. The terms "module", "tool", and/or "component" as used herein may generally represent software, hardware, firmware, or any combination thereof. For instance, the terms "tool" and "module" can represent software code and/or other types of instructions (e.g. a software application) that can be configured and utilized to perform specified tasks when executed on one or more computing devices.

Generally, the illustrated separation of modules, tools, or components and functionality into distinct units may reflect an actual physical grouping and allocation of such software, firmware, and/or hardware. Alternatively or additionally, this illustrated separation can correspond to a conceptual allocation of different tasks to the software, firmware, and/or hardware. Furthermore, it is to be appreciated and understood that the illustrated modules, tools, and/or components and functionality described herein can be located at a single site (e.g., as implemented by a computing device), or can be distributed over multiple locations (e.g., as implemented over multiple computing devices).

Compliance Tool Set and Compliance Related Tasks

In at least one embodiment, a compliance tool set (CTS) of one or more compliance tools can be configured and utilized in accordance with the described techniques to interactively manage an entity's compliance with applicable compliance requirements (i.e., requirements) by effectively operationalizing the entity's compliance resources. For example, the CTS can include an ICSD that can be configured and utilized to interactively guide designated ICSD users associated with the entity through the completion, or partial completion, of one or more CRT instances.

Additionally, the CTS can also include a CTS audit tool that can be configured and utilized to track and document individual ICSD user activities, including ICSD user interactions with instances such as the completion or partial completion of a CRT instance for example. As will be described in further detail below, any number of CRT instances can be created, completed and tracked for a corresponding CRT by utilizing functionality of the ICSD.

In at least one embodiment, a software as a service (SaaS) licensing and/or delivery model can be utilized to provide functionality of the CTS to individual ICSD users. In such an embodiment, an individual ICSD user can access the CTS functionality, including the ICSD, via a web browser or other similar type of application. As noted above, this can include interactively guiding ICSD users through the completion and tracking of CRT instances of CRTs.

For purposes of discussion, a CRT can be considered an expression of one or more actions and/or determinations to comply with one or more requirement (i.e., compliance requirement(s)). In other words, a CRT can identify, and thus include, one or more actions and/or determinations deemed necessary to comply with one or more requirement(s).

Each such requirement might, for example, be found in a compliance source, such as a law or statute, rule, regulation, guideline, policy or procedure, preferred practice, or the like. The CRT, in turn, can be derived from, and thus based on, that compliance source and/or one or more other compliance sources.

In at least one embodiment, a CRT can include CRT elements. As such, each CRT instance of that CRT can also include the CRT's element(s) as a CRT instance element(s). For purposes of discussion, a CRT instance element may be referred to herein as a CRT element or as a CRT instance element. A CRT element can include one or more related actions and/or determinations of a CRT. In other words, a CRT element can represent, and thus include, one or more related actions and/or determinations deemed necessary to meet some or all of one or more compliance requirements associated with a CRT.

As explained below, in at least one embodiment the ICSD can be configured and utilized to track the completion of individual CRT elements of a CRT instance in order to determine the completion status of that CRT instance. This completion status and the CRT instance's deadline can then be utilized by the ICSD to determine the CRT instance's current compliance state.

In at least one embodiment, a CRT element can include one or more CRT sub-elements. Each CRT sub-element of a CRT element can be associated with one or more actions and/or determinations associated with that CRT.

Figure 1:
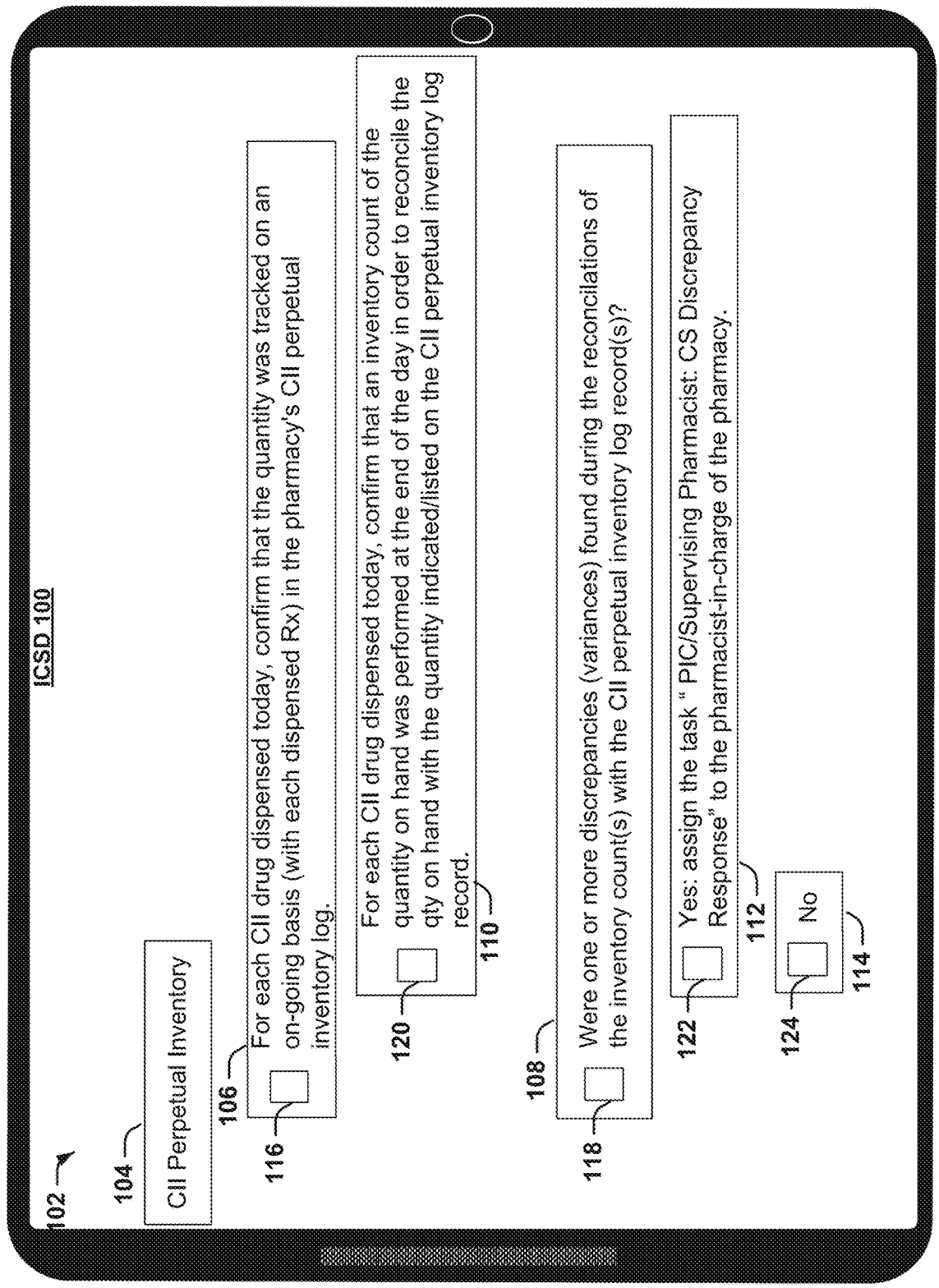
FIGS. 1-10 each illustrate a screenshot of an example interactive compliance status dashboard (ICSD) of an example compliance tool set (CTS), in accordance with at least one embodiment.

As an example, FIG. 1 illustrates an example ICSD 100 configured to provide (e.g., track, present, display, render, etc.) an example CRT instance 102 in accordance with at least one embodiment. Note that in this example, the ICSD 100 is illustrated as being accessible via a web browser or other similar type of application implemented on a tablet mobile computing device. However this is not to be interpreted as being limiting, and it is to be appreciated and understood that an ICSD implemented in accordance with the described techniques can be accessed via any suitable application or applications implemented on any suitable type or types of computing devices (e.g., laptop(s), mobile phone(s), desktop computer(s), server(s), personal digital assistant(s), smart watch(s), or any of a variety of ever-evolving or yet to be developed type of computing device).

Referring to FIG. 1, the CRT instance 102 includes a CRT title 104, namely "CII Perpetual Inventory". Accordingly, the CRT instance 102 is entitled (i.e., named) "CII Perpetual Inventory". The CRT instance 102 also includes two CRT elements, namely CRT element 106 and CRT element 108. Note that the CRT element 106 is associated with the action of confirming that the quantity of each schedule II (i.e. "CII") drug dispensed that day was tracked in the pharmacy's CII perpetual inventory log.

In this example, the CRT element 106 includes a CRT sub-element 110 that is related to the CRT element 106. More particularly, the CRT sub-element 110 is associated with the action of confirming that an inventory count was performed at the end of a particular day for each CII dispensed that day.

The CRT element 108, in turn, is associated with the action of determining whether one or more discrepancies were found in the inventory counts for the CII perpetual inventory log. The CRT element 108 includes a CRT sub-element 112 that is associated with the determination that one or more discrepancies were found and with an action associated with the CRT element 108. More particularly, in this example the CRT sub-element 112 is associated with the action of assigning another task entitled "PIC/Supervising Pharmacist: CS Discrepancy Response" to the PIC (i.e. pharmacist in charge) when it is determined that the one or more discrepancies were found. The CRT element 106 also includes a CRT sub-element 114 that is associated with a determination that one or more discrepancies were not found. Note that if a determination is made that a discrepancy was not found, there is no corresponding action associated with this determination.

Interactive Compliance Status Dashboard

As noted above, the ICSD of the CTS can be configured and utilized to interactively guide designated ICSD users associated through the completion, or partial completion, of individual CRT instances. Said another way, a ICSD user can interact with an individual CRT instance and, in some circumstances, complete some or all of that CRT instance, via the ICSD.

As explained in further detail below, the ICSD can be configured and utilized to track the current compliance state of each CRT instance. A CRT instance's current compliance state can be determined by the ICSD at any particular date and time based on: whether or not and when the CRT instance was completed (i.e., the CRT instance's completion status) and the deadline for the CRT instance. Said another way, a CRT instance's current compliance state can be based on (1) the CRT instance's completion status (e.g., (i) not completed or (ii) completed) and (2) the CRT instance's deadline.

A CRT's compliance state can be determined and categorized in any suitable way. For example, in at least one embodiment the ICSD can attribute one of four defined compliance states to the CRT instance at a certain date and time. More particularly, if the CRT instance has not been completed but the deadline has not passed and is not within a pre-defined period of time that is considered to be risky, the CRT instance can be attributed a currently-compliant state. This pre-defined period of time can be a modifiable CRT attribute of the CRT for the CRT instance.

If the CRT instance has not been completed but the deadline has not passed but is within a pre-defined period of time that is considered to be risky, the CRT instance can be attributed a risk-compliant state. If the CRT instance was completed before its deadline, then the CRT instance can be attributed a completed-compliant state. Finally, if the CRT instance was not completed before its deadline, then the CRT instance can be attributed a currently-compliant state.

In at least one embodiment, the behavior of an individual CRT instance can be based on that CRT instance's current compliance state and how the CRT for that CRT instance has been configured. More particularly, the CRT can be configured with CRT attributes and behavioral logic that can be utilized by the ICSD to determine how each CRT instance of that CRT appears, sounds, and/or behaves when it is in a certain compliance state.

In at least one embodiment, the ICSD can be configured such that the completion of any CRT elements and/or sub-elements of a CRT instance is limited to certain ICSD users and/or defined groups of ICSD users (i.e., ICSD user groups) that have been assigned to that CRT instance. In other words, the ICSD can limit the completion of a CRT instance to ICSD users or ICSD user groups assigned to that CRT instance.

The completion of individual CRT elements (and thus any CRT sub-elements of those CRT elements) can be accomplished in any suitable way. For example, a ICSD user assigned to a CRT instance can complete one or more CRT elements and/or sub-elements of that CRT instance by interacting with each such CRT element and/or sub-element via the ICSD.

In at least one embodiment for example, the means by which a ICSD user is able to complete an individual CRT element of a CRT instance can be based on the attributes of the CRT for that CRT instance. For example, note that in this example each of the CRT elements and CRT sub-elements of the CRT instance 102 include a corresponding interactive CRT component that a ICSD user can interact with in order to indicate CRT element or CRT sub-element completion.

Figure 2:
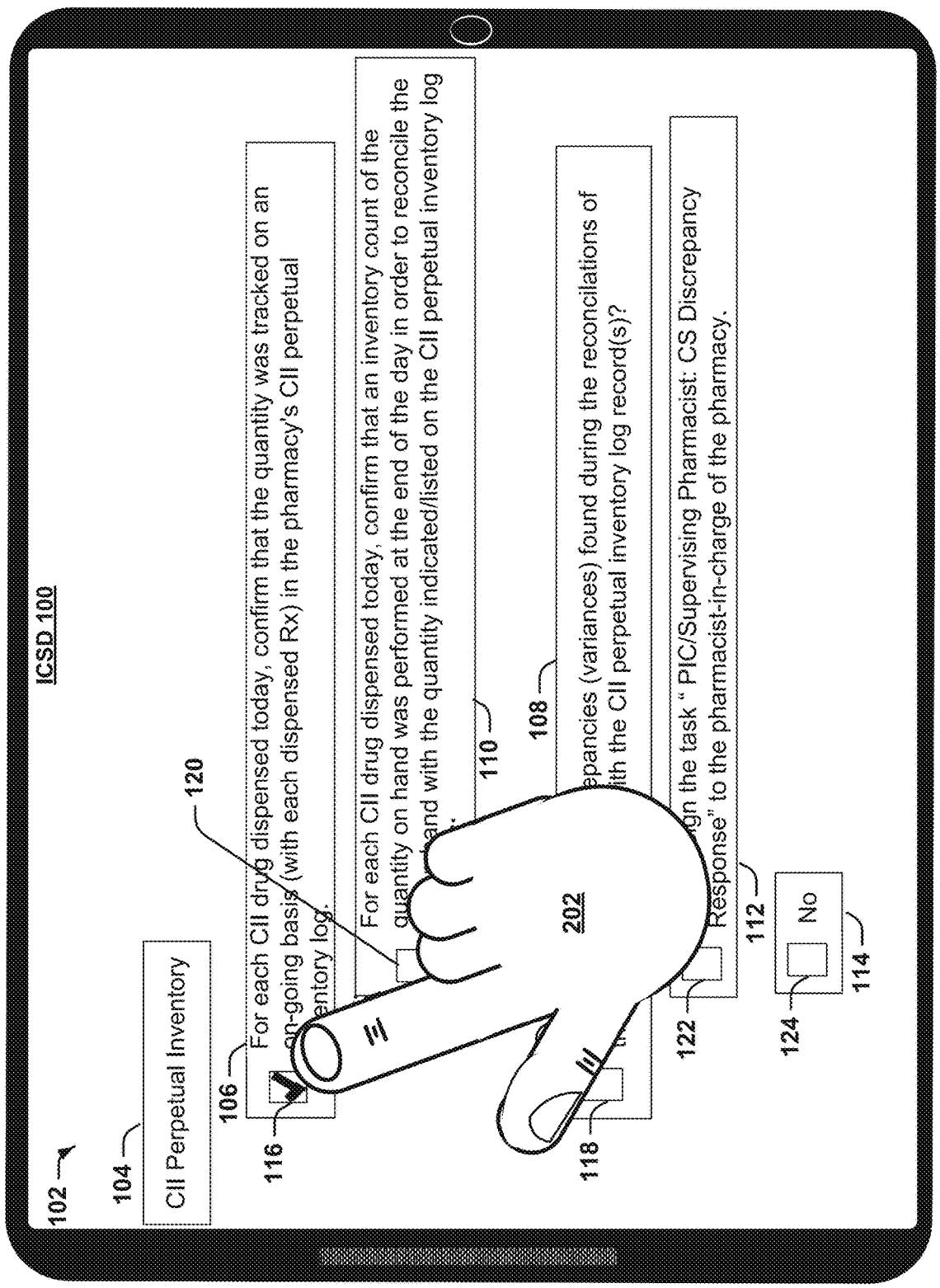

More particularly for instance, as illustrated in FIG. 2 the CRT element 106 includes an interactive CRT component 116 that can be selected by a ICSD user 202 in order to indicate the completion of the CRT element 106. Similarly, the CRT sub-element 110 includes an interactive CRT component 120, the CRT element 108 includes an interactive CRT component 118, and the CRT sub-elements 112 and 114 each include interactive CRT components 122 and 124, respectively.

Note that the interactive components illustrated in FIGS. 1 and 2 and described above are merely examples, and it is to be appreciated and understood that individual CRT elements and CRT sub-elements can be configured in any suitable manner that allows interaction (e.g., completion) by a ICSD user.

For example, without limitation, completion of an individual CRT element or sub-element might require one or more of the following ICSD user inputs: selection of a date and/or time, upload of a document, selection of one or more possible choices (e.g., associated with a determination), text and/or number(s) input (e.g. an auditor's or requestor's name, an auditor's or requestor's badge number, etc.), reassigning a partially completed CRT instance to another ICSD user and/or ICSD user group, and/or assigning a CRT instance to another ICSD user and/or ICSD user group during the completion of another CRT instance.

Consider again, for instance, the example illustrated in FIG. 2. The ICSD user 202 can effectively attest that the quantity of each CII drug dispensed that day was tracked by interacting with and completing the CRT element 106 via the ICSD 100. More particularly, the ICSD user 202 can attest to this by selecting (e.g., checking) the CRT attestation component 116.

In at least one embodiment, the ICSD and/or a CTS audit tool of the CTS can be configured and utilized to record each ICSD user interaction with a CRT element or sub-element as an auditable record. This can include each interaction that is a completion or partial completion of a CRT element or sub-element. For example, the identity of the ICSD user, the date and/or time of the interaction, the details of the interaction (e.g., each click, keystroke, selection, etc.), and the CRT instance and element and/or sub-element implicated can be recorded and saved.

In at least one embodiment, the ICSD functionality can be used to hold individual ICSD users and/or ICSD user groups accountable for the completion and confirmation thereof of specific CRT instances assigned to them. For instance, as described in further detail below, the current compliance state of each such CRT instance and/or group or set of CRT instances can be tracked and presented (e.g., displayed, rendered, etc.) in real-time via the ICSD. In other words, a CRT instance and/or group or set of CRT instances can be tracked and be displayed in the ICSD based on a particular ICSD user's interactions.

For example. a requirement might be found in a particular provision of an entity's policy or procedure. Consider, for instance, a company's policies and procedures—which in turn may be based on various laws, regulations, and/or best practices. One or more CRTs that are based upon those policies and procedures might be created and utilized to track an entity's compliance with that requirement.

As another example, a requirement may simply be a rule that that has been expressed and that applies to the entity. Consider, for instance, a parent that has set forth one or more rules to a child verbally and/or in writing.

It is to be appreciated and understood that a compliance source may, or may not, be a formal source. Consider, for instance, a preferred pharmacy practice of checking for outdated (i.e. expired) medications on the pharmacy's shelf every other month in accordance with a colored sticker placed on each medication container by the pharmacy. A certain sticker color may correlate with the certain month of expiration such that containers with medication due to expire in the next month can be easily and quickly identified.

Such a practice might not be found in written form in the pharmacy (e.g., as a formal policy or procedure), and instead may simply be an accepted best practice to be implemented and performed in the pharmacy. In such situations, this practice might be considered an informal compliance source. If the requirement is described in a more formal source, such as in the pharmacy's procedures, that procedure might be considered a formal compliance source.

Interactive CTS Edit Tool

In at least one embodiment, the CTS can also include an interactive CTS edit tool that can be configured and utilized to allow a ICSD user with the appropriate CTS privileges to create, delete, configure, and edit CRTs (and thus CRT instances) via the ICSD. For purposes of discussion, such a ICSD user may be referred to herein as a CRT designer.

A CRT designer might, for instance, utilize functionality of the CTS edit tool create and configure a CRT with certain CRT attributes and/or CRT behavioral logic that determines the appearance, sound, and/or behavior of CRT instances of that CRT at a certain date and/or time. In other words, a CRT designer can utilize the CTS edit tool to create and/or edit CRTs with attributes and/or other CRT behavioral logic that determines how individual corresponding CRT instances of the CRTs appear and behave via the ICSD.

For instance, a task builder ICSD component might be provided via the ICSD by the CTS edit tool. As a practical example, consider FIG. 3 in which an ICSD task builder 302 is provided via the ICSD 100. Note that in this example, the ICSD user 202 is shown completing a CRT 303 entitled "CII Perpetual Inventory". In this example, the CRT 303 serves as the CRT for CRT instance 102 described above and illustrated in FIGS. 1 and 2.

Figure 3:
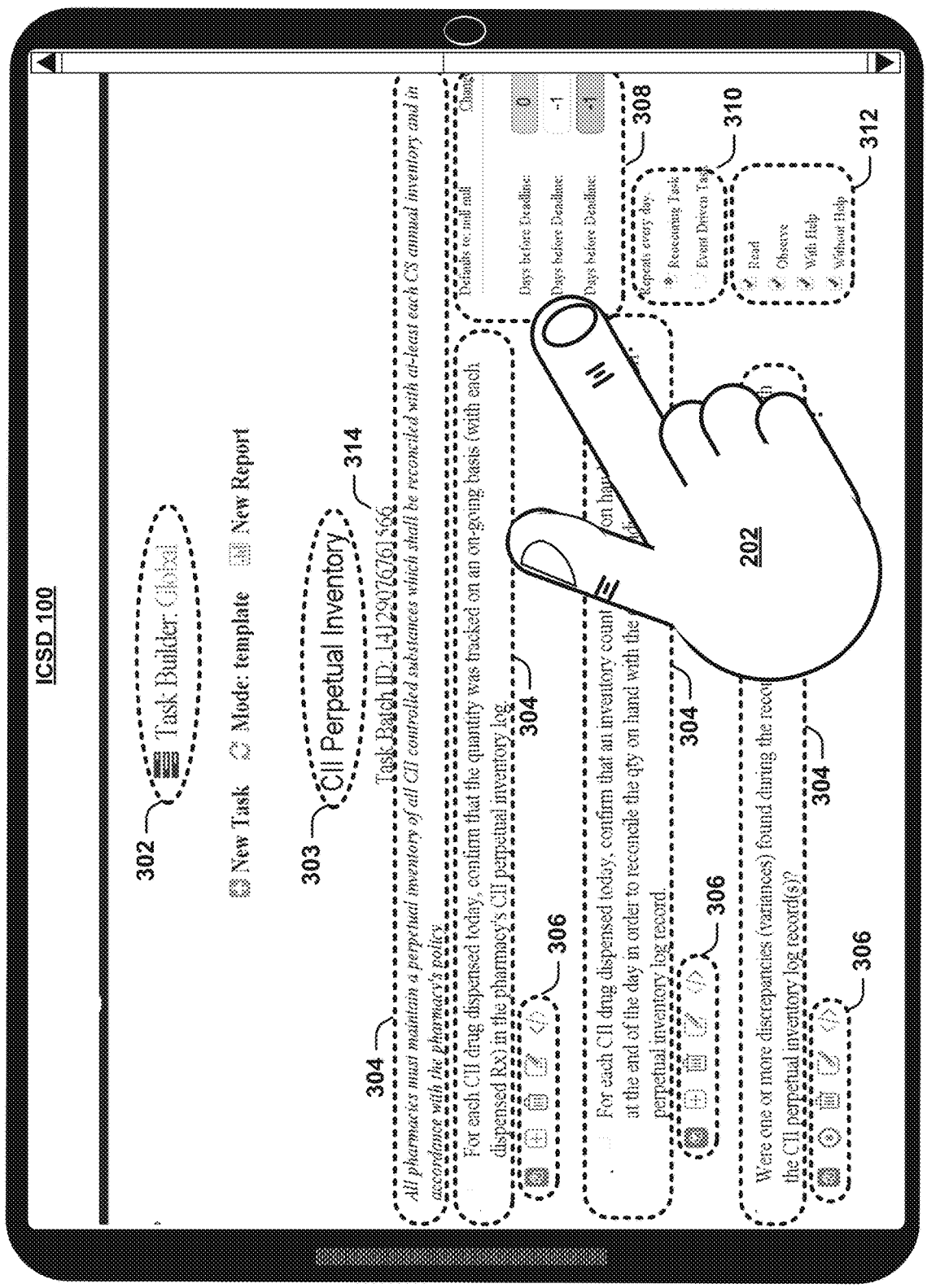

In the example illustrated in FIG. 3, several task builder components are provided to assist the ICSD user 202 in creating and/or editing the CRT 303. For example, several types of task builder element components 304 and 306 are provided to allow the ICSD user 202 to create and edit the content (e.g., text, numbers, characters, symbols, etc.) of each CRT element, and to determine the behavior an requirements of each such CRT element. In other words, the task builder element components 304 and 306 can be utilized to create and configure individual CRT elements of the CRT 303.

Additionally, task element CRT attribute components 308 and 310 are provided to allow the ICSD user 202 to view and/or determine the behavior of each instance of the CRT 303 by configuring the CRT's attributes (i.e., CRT attributes). As will be described in more detail below, individual CRT attributes (e.g., CRT reoccurrence interval attributes, CRT rendering attributes, CRT type attributes, etc.) and CRT behavioral logic can determine how individual CRT instances of a CRT, such as various CRT instances of CRT 103 for example, behave in the ICSD 100.

In this example, also note that a CRT training configuration component 312 is provided to allow the ICSD user 202 to determine what types of CRT instance training activities for the CRT 303 are to be assigned to new ICSD users. More particularly, a new ICSD user might be required to: read through a CRT instance of the CRT 103, observe another ICSD user in completing the CRT instance, complete the CRT instance with help of the other ICSD user, and/or complete the CRT instance without help. In at least one embodiment, a CTS training tool can be configured and utilized to provide individual CRT instance for training for each ICSD user assigned such a training activity.

In at least one embodiment, the process of imparting CRT attributes can be accomplished by providing the CRT designer with the option of imparting CRT behavioral logic to all or part of a CRT as language for CRT component is being inputted. Alternatively or additionally, this can be accomplished by providing the CRT designer with the option of imparting behavioral such logic to all or part of the CRT before and/or after the language of that component has been inputted.

For example, in the context of FIG. 1, the CRT designer might be able to impart CRT attributes and/or behavioral logic to the CRT instance 102 while adding the language of individual elements and/or sub-elements of the CRT 102. Consider, for instance, the language of the CRT sub-element 112: "Yes: assign the task 'PIC/Supervising Pharmacist: CS Discrepancy Response' to the pharmacist-in-charge of the pharmacy.". The CRT designer might impart CRT behavioral logic to the CRT instance 102 by creating and/or changing the CRT sub-element 112 to be dependent upon the determination made at the CRT element 108. More particularly, the logic imparted by the CRT designer might cause the sub-element 112 to not be presented (e.g., displayed, rendered, etc.) in the ICSD unless a determination is made at the CRT element 108 that one or more discrepancies were found.

Interactive CTS Audit Tool

In at least one embodiment, the CTS can also include a CTS audit tool that that can be configured and utilized to document (e.g., record and track) ICSD user activities in the ICSD, such as activities associated with a ICSD user completing a CRT instance and/or training activity and/or confirming the completion. By documenting ICSD user activities, a complete audit trail of each ICSD user activity associated with a CRT instance (e.g., date and time of each CRT instance completion or partial completion) can be provided and stored as auditable compliance data. Additionally, full reporting capabilities based on the stored auditable compliance data can be made provided.

In at least one embodiment, the CTS audit tool can be configured and utilized to record the completion of one or more individual CRT elements of a CRT instance (i.e. CRT instance element(s)), and the completion of that CRT instance when all of the CRT elements are completed.

Additionally, the CTS audit tool can be configured and utilized to record the completion of one or more individual CRT sub-elements of a CRT element. Recall that the completion of an individual CRT element might depend on the completion of each CRT sub-element of that CRT element. As described above, this can include, for instance, recording one or more user interactions (e.g., inputs) that are necessary for the completion of an individual CRT element or sub-element (e.g., a checkbox, date/time selection, choosing one or more options from a list, document(s) upload, text input, etc.).

In at least one embodiment, the CTS audit tool can alternatively or additionally be configured and utilized to assist with an entity's internal audits with respect to the completion of individual CRT elements. For example, an audit-focused CRT might include CRT elements and/or sub-elements directed to ensuring (e.g., confirming) that other CRT elements and/or sub-elements of another CRT were completed accurately and/or truthfully.

CRT Attributes

CRTs can be configured (e.g., by utilizing CTS edit tool functionality via the ICSD) in any suitable way. For example, a CRT may be configured to have one or more CRT attributes that determine how an instance of that CRT behaves in the ICSD (e.g. when and how a CRT instance is presented in the ICSD).

For example, a CRT may be configured with a CRT type attribute that determines whether the compliance activities of the CRT are to be: (1) regularly-scheduled, reoccurring compliance activities that should be completed after a defined time interval, (2) event-driven compliance activities that should be completed in response to an occurrence of a particular type of event or events, or (3) both reoccurring compliance activities and event-driven compliance activities.

A CRT can thus be classified as (and referred to herein as) being: (1) a reoccurring CRT type, (2) an event-driven CRT type, or (3) a reoccurring and event-driven CRT type. Each instance of that CRT, as described further below, may thus also be referred to as being: (1) a reoccurring CRT instance, (2) an event-driven CRT instance, or (3) a reoccurring and event-driven CRT instance.

A CRT that is a reoccurring CRT type can be configured with a CRT reoccurrence interval that can be utilized by the CTS to determine the frequency by which compliance activities of a CRT need to be completed in order for an entity to remain compliant with respect to that CRT. For example, a reoccurrence interval setting attribute for the CRT can be configured by a designer via the ICSD.

Thus, as explained in further detail below, a CRT's CRT reoccurrence interval attribute setting can be utilized by the CTS to determine the deadline for each regularly-scheduled reoccurring scheduled CRT instance of that CRT. Each adjacent deadline, and thus regularly-scheduled reoccurring scheduled CRT instance of that CRT, can be separated from one another by a time span equal to that CRT's reoccurrence interval. A CRT reoccurrence interval attribute can be defined and measured in any suitable time unit or units, such as in months, weeks, years, days, hours, minutes, etc.

Consider, for instance, an inventory-related CRT that includes compliance activities associated with performing a comprehensive inventory count of drugs in a pharmacy (i.e. a drug inventory-related CRT). Certain laws and/or regulations might require that a comprehensive inventory count be performed on a regularly-scheduled, reoccurring basis— such as yearly for instance. However, certain laws, regulations, and/or policies or procedures of an entity may also require that a comprehensive inventory count be performed in response to certain types of event, such as a robbery or transfer of ownership of the pharmacy.

As such, an inventory-related CRT can be considered both a reoccurring CRT type and an event-driven CRT type since its compliance activities can be both regularly-scheduled reoccurring compliance activities and event-driven compliance activities that should be completed in response to an occurrence of a particular type of event or events, such as a robbery or transfer of ownership for instance. An inventory-related CRT may be configured with a CRT reoccurrence interval attribute measured in a suitable time unit(s).

As another example, a CRT can be configured with a CRT rendering attribute that determines the behavioral, visual, and/or audible characteristics that can be attributed to each individual instance of that CRT (i.e. CRT instance) based upon the current compliance state of that particular CRT instance. In other words, the current compliance state of a CRT instance provided in the ICSD can be utilized to determine the behavioral, visual, and/or audible characteristics of that CRT instance in the ICSD.

One example of a characteristic that can be determined by a CRT rendering attribute is a distinctive color to be associated with a CRT instance that visually indicates (i.e. presents, displays, etc.) that CRT instance's current compliance state (e.g. red, green, or yellow). Another example of a characteristic that can be determined by a CRT rendering attribute is a distinctive behavior to be associated with a CRT instance that visually indicates that CRT instance's current compliance state, such as a flashing behavior for instance.

Consider, for instance, an inventory-related CRT associated with performing a comprehensive inventory count of drugs. As described in detail below, this inventory-related CRT can be configured with CRT rendering attributes that determine the distinctive color and/or behavior to be automatically attributed to each CRT instance of this CRT at a certain time based upon that instance's current compliance state at that time.

CRT Instances

As explained above, a CRT instance can be considered a version of an underlying CRT. The date and/or time that a CRT instance needs to be completed can be referred to as the deadline for that CRT instance. A CRT instance's current compliance state at a certain date and/or time can thus be based on whether or not that instance been completed and whether the certain date and/or time is before or after the deadline for that instance.

A scheduled CRT instance can be considered a CRT instance that: (1) has been assigned to a ICSD user, or ICSD user group, and (2) has a deadline. A scheduled CRT instance needs to be completed no later than that its deadline in order for the entity to remain compliant with the one or more requirements associated with that instance.

The ICSD user and/or ICSD user group that the scheduled CRT instance has been assigned to can be deemed accountable for ensuring that that CRT instance is completed no later than that instance's deadline. For purposes of this discussion, a ICSD user group can be created and edited (e.g. modified) via the CTS (e.g. via the ICSD) and may include any number of ICSD users.

A scheduled CRT instance's deadline may be determined by the entity (e.g. a CRT designer), and may correspond to a date and/or time mandated by a compliance source or individual (e.g. front-line manager, compliance officer, leadership, etc.). A ICSD user, such as a manager for instance, can be provided the necessary privileges that allow them to choose the deadline and assign it to that particular CRT instance via the CTS.

An unscheduled CRT instance (i.e. a CRT instance that has not been scheduled) can be considered a CRT instance that: (1) has not been assigned to a ICSD user or ICSD user group and (2) has not been assigned a deadline. An unscheduled CRT instance can become a scheduled CRT instance when it is assigned to a ICSD user or ICSD user group, and when it is assigned a deadline.

As explained above, each CRT, and thus each CRT instance corresponding to that CRT, can include one or more individual CR elements, and in some circumstances one or more individual CRT sub-elements. Each CRT element and/or sub-element can represent one or more individual compliance activities that may be necessary, based upon the CRT component's content, for the completion of that CRT instance.

For example, the CTS might provide a ICSD user that is assigned one or more CRT instances with functionality via the ICSD that can effectively walk that CRT user through making selections and confirming (i.e. attesting to) the completion of various CRT elements and/or sub-elements.

In at least one embodiment, an interactive CRT instance can be provided to a ICSD user via the ICSD. The ICSD user, for example, might have been assigned to the CRT instance and/or might be included in a ICSD user group that has been assigned to that CRT instance. If the CRT instance is a scheduled CRT instance, as described in further detail below, the ICSD user can then interact with that CRT instance via the ICSD by completing, or partially completing, it.

For example, if the ICSD user completes all of the CRT elements of the CRT instance that are necessary for that CRT to be completed, then the ICSD user has completed that CRT instance. However, if the ICSD user has completed less than all of the CRT elements necessary for completion, then that ICSD user has partially completed that CRT instance.

When a ICSD user completes a CRT element or sub-element of a CRT instance, that ICSD user has effectively attested to the completion of all of the actions and/or determinations necessary for the completion of that CRT element and/or sub-element. As explained, each such completion, and thus attestation, can be documented via the CTS audit tool. Accordingly, when a ICSD user completes all of the CRT elements of a CRT instance, that ICSD user has effectively attested to the completion of all of the actions and/or determinations necessary for the completion of that CRT instance.

In some circumstances, based upon the content of the CRT element, the ICSD user might be required to interact with the ICSD via one or more interactive CRT components to confirm that various CRT elements and/or sub-elements have been completed. As explained above, this interaction might include user inputs such as selecting a date and/or time, uploading a document, selecting one or more possible choices, inputting text, reassigning a partially completed CRT instance to another ICSD user and/or ICSD user group, assigning a CRT instance to another ICSD user and/or ICSD user group during the completion of another CRT instance, etc.

If the CRT instance is not a scheduled CRT instance (i.e. is an unscheduled CRT), the ICSD user may interact with the ICSD to assign the unscheduled CRT instance to a particular ICSD user and/or ICSD user group, and to assign the unscheduled CRT instance a deadline.

For purposes of discussion, the process of assigning an unscheduled CRT instance to a ICSD user and/or ICSD user group, and assigning the unscheduled CRT instance a deadline, may be referred to herein as scheduling that unscheduled CRT instance. In at least one embodiment, the CTS edit tool can be configured and utilized to allow a CRT designer or other ICSD user with sufficient privileges to schedule CRT instances via the ICSD.

By scheduling an unscheduled CRT instance, that CRT instance can be automatically converted to a single scheduled CRT instance or multiple scheduled CRT instances. For example, if the underlying CRT for that CRT instance is configured to be a reoccurring CRT type, then scheduling might result in multiple scheduled CRT instances. Each of these multiple scheduled CRT instances can be separated from one another in accordance with their corresponding respective deadlines by a time span that is automatically determined by the CTS based upon the reoccurrence interval attribute setting of the underlying CRT.

In operation, the deadline for an initial scheduled CRT instance can be determined by a CRT user when that user initially schedules the unscheduled CRT instance version of that scheduled CRT instance. For example, the CRT user may simply select a date and/or time for the deadline. The CTS can then automatically assign a deadline to each subsequent reoccurring scheduled CRT instance based upon the reoccurrence interval attribute setting of the underlying CRT.

For example, if an underlying reoccurring CRT is configured with a CRT reoccurrence interval of 12 months, and the initial scheduled CRT instance is assigned deadline of Jan. 1, 2014. The second scheduled CRT instance can be automatically assigned a deadline of Jan. 1, 2015, the third scheduled CRT instance a deadline of Jan. 1, 2016, and so on.

For each scheduled CRT instance, a CRT user may confirm (i.e., attest to) the completion (i.e. performance) of one or more applicable CRT elements and/or sub-elements that are necessary for that scheduled CRT instance to be completed.

Current Compliance State

In at least one embodiment, and as explained above, the current compliance state of a scheduled CRT instance at a certain point in time, such as the current date and/or time (i.e. date/time), can be classified as being one of four possible current compliance states: completed-compliant, currently-compliant, risk-compliant, or non-compliant.

More particularly, a scheduled CRT instance that has been completed, and confirmed and documented as such in the CTS at a date/time that is before that instance's deadline, can be considered completed-compliant. A scheduled CRT instance with a deadline that has not yet occurred, and that is not considered to be at risk of not being completed and documented on or before that deadline, can be considered currently-compliant.

In at least one embodiment, the underlying CRT for the scheduled CRT instance might, for example, be configured with a CRT rendering attribute that causes the scheduled CRT instance to be presented in the ICSD as green (i.e., displayed as green by the CTS (e.g. via the ICSD)) when that CRT instance is determined to have a completed-compliant or currently-compliant compliance state.

Continuing, a scheduled CRT instance with an assigned deadline that has not yet occurred, but that at the current date and/or time is considered to be at risk of not being completed and documented on or before that deadline, can be considered risk-compliant. In at least one embodiment, the underlying CRT for the scheduled CRT instance might, for example, be configured with a CRT rendering attribute that causes the scheduled CRT instance to be presented as yellow (i.e., displayed as yellow by the CTS (e.g. via the ICSD)) when that CRT instance is determined to have a risk-compliant state.

Finally, a scheduled CRT instance that was not completed and documented as such in the CTS on or before that instance's deadline can be considered non-compliant. In at least one embodiment, the underlying CRT for the scheduled CRT instance might, for example, be configured with a CRT rendering attribute that causes the scheduled CRT instance to be presented as red (i.e., displayed as red by the CTS (e.g. via the ICSD)) when that CRT instance is determined to have a non-compliant state.

CRT and CRT Instance Grouping

Individual CRTs, and thus individual scheduled and/or unscheduled CRT instances, can be grouped together in the ICSD in any suitable way. In at least one embodiment for example, one or more CRTs (and thus assigned CRT instances) can be grouped together in a set (i.e. a CRT set) and/or hierarchically related to one another based upon one or more characteristics that each CRT (and thus each assigned CRT instance) in that CRT set have in common with one another.

Furthermore, individual CRT sets can be grouped together in any number of parent CRT sets and/or hierarchically related to one another based upon one or more characteristics that each child CRT set in that parent set have in common with one another. For a particular CRT set, that set might therefore be considered a parent CRT set with respect to any child CRT set that it includes, and/or may be considered a child CRT set with respect to any parent CRT set that it belongs to.

As such, a grouping of one or more child CRT sets and corresponding parent CRT sets can be associated with one another as a hierarchical tree of hierarchically related parent sets, each including one or more parent sets of CRT sets and/or one or more CRT sets.

As a practical example, recall that individual CRTs can be derived from, and thus based on, a particular requirement in a compliance source, such as on a particular provision (i.e. section) of an entity's policy or procedure for instance. Therefore, multiple CRT sets can be grouped and hierarchically related to one another based on the particular policy or procedure, or policy or procedure provision, that each CRT (and thus each CRT instance) is derived from (i.e. based on).

CRTs that are based on a particular provision of a procedure, for instance, might be grouped together in a CRT set. The CRT set might be grouped with other CRTs sets that each correspond to another provision or provisions of the procedure to form a parent CRT set that is based on all of the procedure's provisions.

The parent CRT set might, in turn, be grouped with other parent sets that correspond to other procedures that are also referenced by the policy and/or otherwise related to form a higher-order parent set, and so on. Consider, for instance, a set of scheduled CRT instances that are all based on a compliance source, or portion thereof. A parent CRT set might be based on a procedure or policy, and each child CRT set of the parent CRT set might itself include one or more child CRT sets. In this regard, each such child set might include one or more individual scheduled CRT instances that correspond to a particular provision or provisions of the policy or procedure.

Various policies and/or procedures might, in turn, be related to one another in accordance with a classification scheme. Consider, as a non-limiting example, various policies or procedures associated with an outpatient pharmacy's compliance. A classification scheme that groups these policies and/or procedures together by the compliance-related subject matter that each addresses might include the following subject matter classifications: Pharmacy Access, Licensing/Education, Patient Care, Investigation/Audit, and Medication Management.

Each such subject matter classification might be a parent CRT set that includes one or more child CRT sets that correspond to individual policies and/or procedures related to that classification. Furthermore, each such subject matter classification might include one or more subject matter sub-classifications, and each sub-classification might, in turn, include one or more sub-classifications, and so on.

Attributes of CRT Instances and CRT Sets

As described above, by virtue of an underlying CRT being configured with one or more CRT attributes and/or other CRT behavioral logic via a CTS edit tool, each CRT instance of that CRT can behave and/or be presented in accordance with that CRT instance's current compliance state.

For example, as described in further detail below, descriptive text and/or one or more distinctive colors can be attributed to each scheduled CRT instance based upon that instance's current compliance state. For example, as described above, a ICSD user may utilize the CTS edit tool to accomplish this. In this way, the current compliance state of each CRT instance can be easily visually discerned (e.g., by a ICSD user or non-ICSD user) via the ICSD, even at a cursory glance.

Similarly, descriptive text and/or one or more distinctive colors can be also attributed to each CRT set based upon the compliance state of each scheduled CRT instance and/or child CRT set of that CRT set. In this way, the compliance state of each CRT set can also be easily visually discerned via the ICSD, even at a cursory glance.

For example, with respect to individual scheduled CRT instances, in at least one embodiment a green color can be attributed to each scheduled CRT instance with a compliance state of completed-compliant (i.e., to each completed-compliant assigned CRT instance) or currently-compliant (i.e., to each currently-compliant assigned CRT instance).

A yellow color, in turn, can be attributed to each scheduled CRT instance with a compliance state of risk-compliant (i.e., to each risk-compliant assigned CRT instance). Finally, a red color can be attributed to each scheduled CRT instance with a compliance state of non-compliant (i.e., to each non-compliant assigned CRT instance).

With respect to individual CRT sets, in at least one embodiment, a red color can be attributed to each CRT set that includes at least one non-compliant scheduled CRT instance. If a CRT set does not include at least one non-compliant scheduled CRT instance but includes at least one risk-compliant scheduled CRT instance, then a yellow color can be attributed to that CRT set. If a CRT set does not include at least one non-compliant scheduled CRT instance or risk-compliant assigned CRT instance, then a green color can be attributed to that CRT set.

Alternatively or additionally, text in the form of numbers and/or letters can be associated with one or more individual assigned CRT instances to identify the name, deadline, etc. of the corresponding CRT instance. Similarly, text in the form of numbers and/or letters can be associated with a CRT set to identify the CRT set's name.

As another example, a CRT attribute might be the number of days before the CRT's deadline that CRT instances of that CRT are presented as yellow and/or red. For instance, if a CRT attribute indicates that corresponding CRT instances are to turn yellow three (3) days prior to the deadline and red on the day of their deadline, then this will determine when each such CRT instance (with a corresponding deadline CRT attribute) changes color in the ICSD.

ICSD

In at least one embodiment, the CTS can also be configured and utilized to include and/or provide (e.g. present) an ongoing, current (i.e. real-time), interactive representation of an entity's compliance state based upon the current compliance state of each scheduled CRT instance and/or CRT set for that entity. Recall that each scheduled CRT instance can be based on (e.g. derived from) that entity's compliance source(s).

For example, an ICSD can be configured and utilized by a ICSD user (e.g. on behalf of the entity and/or other interested party) to interactively guide designated ICSD users assigned to one or more scheduled CRT instances through the completion (or partial completion) and tracking of the scheduled CRT instance(s) via the ICSD.

Designated ICSD users may be individually assigned to one or more scheduled CRT instances. Alternatively or additionally, one or more designated CRT users may belong to a ICSD user group that may be assigned to one or more scheduled CRT instances. One or more of the ICSD users belonging to that ICSD user group can then be responsible for completing at least one of scheduled CRT instances assigned to the ICSD user group. As noted above, each ICSD user's interactions with the scheduled CRT instance(s) to which they, or their ICSD group, have been assigned.

For example, a ICSD user group that represents a particular shift (e.g. Afternoon Shift ICSD user group) at a company may include various ICSD users that, on any particular day, may or may not be working. One or more of the ICSD users working the afternoon shift on a particular day may thus be responsible on that particular day for completing, and confirming the completion, at least one of the scheduled CRT instances assigned to that ICSD user group.

The ICSD can also be configured and utilized by a ICSD user (e.g. on behalf of the entity and/or other interested party) to track each scheduled CRT's instance's current compliance state in real-time via the ICSD, and thus to track the entity's current compliance status in real time.

Alternatively or additionally, the ICSD can be configured and utilized by a ICSD user to easily and quickly respond to (e.g., address) and/or resolve each CRT instance via the ICSD that has not been completed and documented in the CTS by that instance's deadline, or that is deemed to be at risk of not being completed and documented in the CTS by the deadline.

In at least one embodiment, the ICSD can be configured such that it can provide multiple different types of interactive ICSD components in the ICSD that together provide a tremendous amount of information about an entity's compliance state in response limited interaction from a ICSD user. These interactive ICSD components can include realtime current representations of various assigned CRT instances and/or CRT sets based upon that instance's and/or set's current compliance state, respectively.

As a result, and as described and illustrated below, the ICSD and ICSD functionality can be easily accessed and utilized by a ICSD user via a wide variety of types of devices, including computing devices such as personal computers (desktop, portable laptop, etc.), cell phones, server computing devices, tablets, smart phones, personal digital assistants, or any of various ever-evolving or yet to be developed types of computing devices.

Recall, for instance, that in at least one embodiment a SaaS licensing and/or delivery model can be utilized to provide functionality of the CTS to individual ICSD users. In such an embodiment, an individual ICSD user can access the CTS functionality, including the ICSD, via a web browser or other similar type of application.

In at least one embodiment, various types of interactive ICSD components configured and utilized via the ICSD to assist a ICSD user to navigate between various hierarchical subject matter classification levels, and corresponding policy or procedure classification levels, by simply interacting with the individual interactive ICSD components. Furthermore, each classification level can be associated with individual corresponding scheduled CRT instances and/or CRT sets that are relevant to that particular classification level.

In at least one embodiment, an individual ICSD component can be configured to be represented in the ICSD with a color and/or other characteristic that represents the current compliance state of one or more corresponding CRT sets and/or scheduled CRT instances associated with that ICSD component.

For example, one type of ICSD component might be a subject matter navigation (SMN) component that corresponds with a subject matter classification and/or sub-classification. Each subject matter classification and/or sub-classification may be associated with one or more individual CRT instances and/or individual CRT sets. By utilizing (e.g., interacting with) individual SMN components, a ICSD user may navigate between hierarchically related subject matter classifications, which in turn can be associated with CRT sets and CRT instances (scheduled and/or unscheduled). An example of an SMN component might be a CRT set that serves as a parent CRT set and/or child CRT set. For example, a CRT set SMN component might be a child CRT set SMN component grouped with other child CRT set SMN components of a parent CRT set MSN component, and be a parent CRT set SMN component to corresponding child CRT set SMN components.

As described above, an individual SMN component can be configured with descriptive text and/or one or more distinctive colors that represent the subject matter classification and/or sub-classification of that SMN component and/or the current compliance state of one or more CRT sets and/or scheduled CRT instances associated with that SMN.

For example, an SMN component might be a parent CRT set SMN component with multiple child SRT set MSN components and/or CRT instances. The parent CRT set SMN component can be configured with descriptive text that represents its subject matter classification and a color that represents the current compliance state of its associated child SRT set MSN components and/or CRT instances. Said another way, the SMN component can be configured to be presented in the ICSD in a manner that represents the current compliance state of the one or more CRT instances directly and/or indirectly associated with it.

Two other example types of ICSD components might be a CRT instance and a CRT. A CRT instance can correspond with an individual scheduled and/or unscheduled CRT instance. By utilizing such a control, a ICSD user might interact with that individual CRT instance, such as by viewing and/or changing the contents (e.g., CRT elements and/or sub-elements) of that CRT instance's underlying CRT, automatically sending a message (e.g., text, instant message, electronic mail (email), etc.) about the compliance state of that CRT instance, viewing the deadline for that CRT instance, viewing the days past due if applicable (i.e., the number of days past the deadline for the current date and time), and/or assigning and reassigning that CRT instance to another ICSD user and/or ICSD user group.

As a practical example, a ICSD user might utilize a CRT instance to view a CRT instance's CRT elements and/or sub-elements. The ICSD user might then utilize the CRT instance to edit one or more of the CRT elements and/or sub-elements via the CTS edit tool. For instance, the CRT instance might be configured to allow the ICSD user to select and utilize the CTS edit tool while viewing the elements and/or sub-elements functionality.

Yet another type of an ICSD component might be a CRT logical grouping (CRT-LG) component that corresponds with a logical grouping of individual scheduled and/or unscheduled CRT instances, such as a tab or other type of organizational control. An example of such a CRT-LG component might be an "Urgent Tasks" tab that corresponds with scheduled CRT instances with a current status of risk-compliant or non-compliant, and are thus presented in a yellow or red color. Another example might be a "Tasks Due" tab that corresponds with scheduled CRT instances with a current status of currently-compliant that are due to be completed.

Another example type of ICSD component might be a CTS navigation component, such as a directional component, menu of possible selections, or wizard functionality that is configured to facilitate a ICSD user in navigating through the ICSD and/in identifying and selecting specific CRT instances. One example of wizard functionality described below is a CRT event wizard for instance.

Yet another example type of ICSD component might be a CRT search component, such as a search component to allow a ICSD user to search through a group of CRT instances organized and presented via the ICSD.

Yet another example type of ICSD component might be a CRT messaging component to allow a ICSD user to easily and conveniently send a message to one or more individuals and/or groups (e.g. ICSD user(s), ICSD user group(s), non-ICSD users, etc.) about the compliance state of one or more CRT instances.

Yet another example type of ICSD component might be a CRT instance assignment component to allow a ICSD user with sufficient privileges to assign an unscheduled CRT instance to a ICSD user and/or ICSD user group, and/or to reassign a scheduled CRT instance to a another ICSD user and/or ICSD user group. In at least one embodiment, such a CRT assignment can be configured to allow the ICSD user to make assignments and/or reassignments for a group of scheduled and/or unscheduled CRT instances together with fewer commands and/or actions than would otherwise be required had the ICSD user utilized individual CRT components and/or individual CRT instances.

ICSD Component Attributes

As noted above, scheduled and/or unscheduled CRT instances and other types of ICSD components and/or ICSD component groups can be configured with, and thus presented (e.g., displayed, rendered, etc.) in the ICSD with, descriptive text and/or one or more distinctive colors that represent an entity's current compliance status. In other words, descriptive text and/or one or more distinctive colors can be attributed to individual ICSD components.

In at least one embodiment, individual ICSD components (which may include constitute one or more ICSD component groups) can be configured to be presented in the ICSD in a manner that represents an entity's current compliance status. More particularly, each ICSD component can be configured with a set of ICSD component attributes for that ICSD component. As described above, these ICSD component attributes can be utilized by the ICSD to determine the appearance and behavior of individual ICSD components in the ICSD. The collective appearance and behavior of individual ICSD components in the ICSD can represent the entity's current compliance status.

For example, consider a CRT with certain CRT attributes (e.g., CRT reoccurrence interval attributes, CRT rendering attributes, CRT type attributes, etc.) and CRT behavioral logic. Recall that an individual CRT instance's CRT attributes and behavioral logic can be used by the ICSD to determine how that CRT instance of the CRT appears and/or behaves in the ICSD based on the current compliance state of that CRT instance.

As another example, consider an SMN component. Recall that in at least one embodiment, an SMN component can be configured with behavioral logic that allows ICSD users to navigate between hierarchically related subject matter classifications, which in turn can be associated with CRT sets and/or CRT instances (scheduled and/or unscheduled).

Also recall that an SMN component can be configured with presentation attributes as well. For example, an SMN component can be configured with descriptive text that represents its subject matter classification and to be presented in a color that is based upon, and represents, the current compliance state of its associated CRT instances.

For example, an MSN component can be configured to be presented in the ICSD in red if at least one of its associated CRT instances is non-compliant, in yellow if none of its associated CRT instances is non-compliant but at least one of its associated CRT instances is risk-compliant, or in green if each of its associated CRT instances is either completed-compliant or current-compliant.

Accordingly, the behavioral and presentation attributes of an MSN component can be referred to herein as that SMN component's ICSD component attributes. In other words, the ICSD component attributes of an MSN component can include that MSN component's behavioral and presentation attributes. Since these presentation attributes can be based upon the current compliance state of its associated CRT instances, an MSN component's ICSD attributes can be based on collective ICSD component attributes of these CRT instances.

As a practical example of an SMN component, consider an SMN component that represents a subject matter sub-classification for controlled substance recordkeeping in pharmacy in accordance with a pharmacy compliance classification scheme. This controlled substance recordkeeping sub-classification might be hierarchically grouped under a subject matter classification or sub-classification for Medication Management for instance.

As explained above, this controlled substance recordkeeping sub-classification might also include (e.g., be associated with) a CRT set, and thus one or more individual CRT instances. Therefore, the SMN component that represents this controlled substance recordkeeping sub-classification can be configured with ICSD component attributes that determine its appearance and behavior. For example, the SMN component may be presented with descriptive text and/or one or more distinctive colors that represent the current compliance state of the one or more individual CRT instances associated with it.

For example, if at least one of these individual CRT instances has not-compliant status (e.g., and is thus colored red), the SMN component can also be attributed a compliance state of not-compliant and be presented as red. In this way, the compliance state of each visible SMN component can be easily visually discerned via the ICSD, even at a cursory glance.

CRT Event Wizard

Recall that some CRTs, and thus corresponding CRT instances, can be considered event-driven CRT type event-driven compliance activities that should be completed in response to an occurrence of a particular type of event or events.

Note that before the occurrence of an event, a corresponding event-driven CRT instance will likely be unscheduled because that instance has not yet been assigned to a ICSD user or ICSD user group, and has not been assigned a deadline. Therefore, to facilitate a CRT user in identifying one or more appropriate unscheduled CRT instances to schedule in response to an event, in at least one embodiment a CRT wizard can be provided to the ICSD user via the ICSD.

In at least one embodiment for instance, the CRT wizard can interactively assist the ICSD user in selecting an appropriate unscheduled CRT instance by presenting various CRT instances for the CRS user to choose from. The CRS user may initiate this process by interacting with the ICSD in response to an event occurring, such as being approached by an external auditor to conduct an audit, receiving a request for patient information, being robbed, etc.

In at least one embodiment, a CTS navigation component can be provided to assist a ICSD user to initiate the CRT wizard. Once initiated, the CRT wizard can then be configured and utilized to interactively guide the CRT user through the process of selecting an unscheduled CRT instance that corresponds to the event. For example, if the CRT user was approached by an external auditor, one or more unscheduled CRT instances that include appropriate CRT elements and/or sub-elements that identify specific activities (e.g., steps) for the ICSD user to follow in such a circumstance can be identified and selected by the ICSD user via the CRT wizard.

Once selected, in at least one embodiment, an appropriate unscheduled CRT instance can be automatically scheduled by the CRT wizard. For example, the selected unscheduled CRT instance might be automatically assigned, at least initially, to the ICSD user (e.g. by referring to their logged in profile) in response to being selected by the CRT user. Additionally, a deadline for the assigned CRT instance can also be automatically assigned.

In at least one embodiment, the deadline can be automatically determined by virtue of the underlying CRT's configuration. For example, the underlying CRT of the appropriate unscheduled CRT instance might have been configured to automatically assign the deadline once that CRT instance is selected and automatically assigned to the ICSD user. In the example of the CRT user being approached by the external auditor for instance, the underlying CRT might have been configured with a deadline that is 24 hours subsequent to (i.e. after) when the unscheduled CRT instance is selected and/or automatically assigned to the ICSD user.

In at least one, to facilitate the ICSD user in selecting the appropriate unscheduled CRT instance(s), one or more interactive CRT wizard components that are the same as, or similar to, other ICSD components of the ICSD can be provided to the ICSD user. Such CRT wizard components may be referred to herein as ICSD-like components (e.g. SMN-like wizard components), The ICSD user may then utilize these component(s) to identify and select the appropriate unscheduled CRT instance(s).

Example CTS Embodiment

Figure 4:
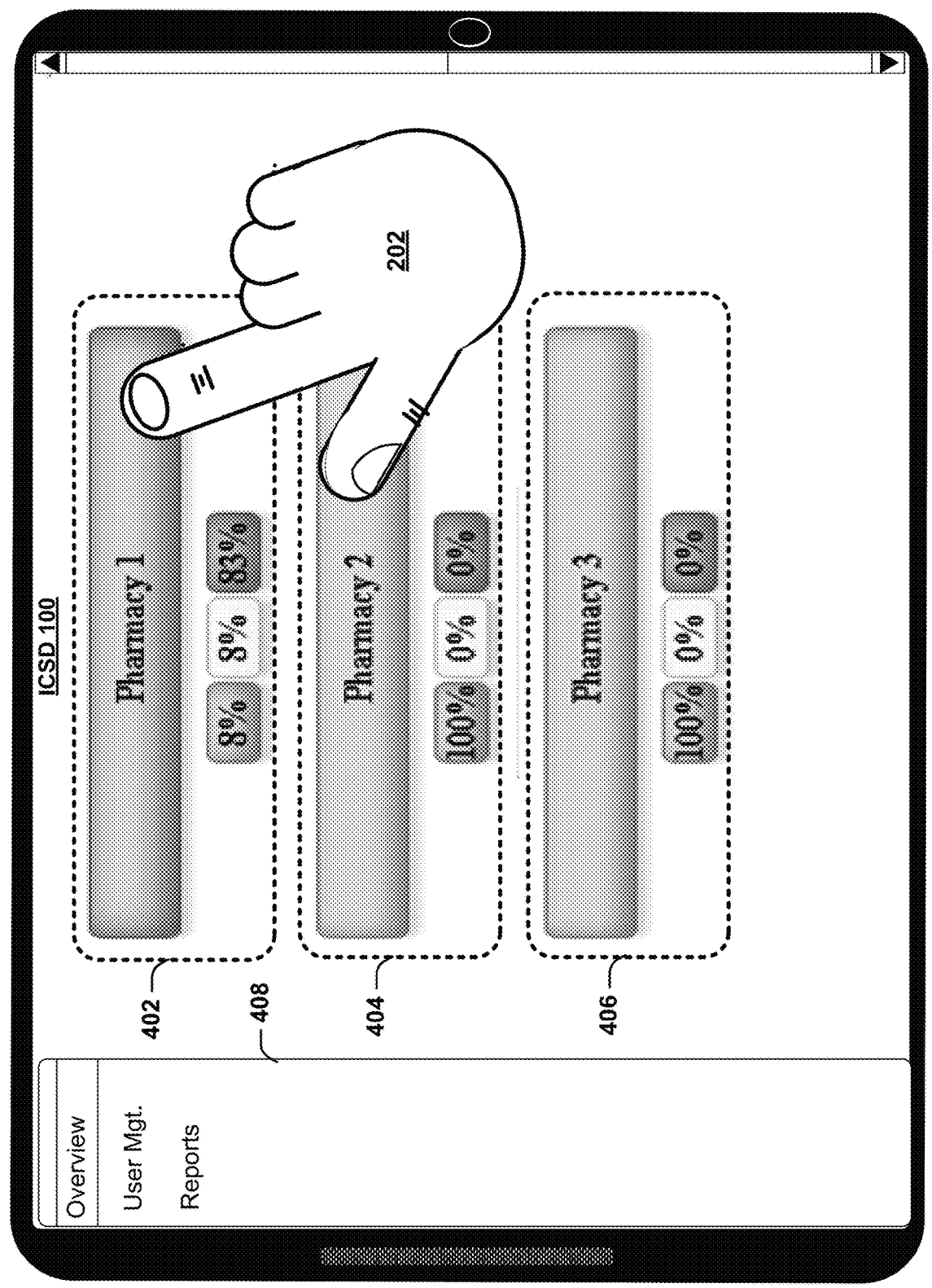

To provide the reader with a practical example of a CTS and the various CTS tools (including the ICSD) that can be implemented in accordance with the described techniques, FIGS. 4 though 14 and the accompanying discussion illustrate and describe various screenshots of the example ICSD 100 illustrated and described in.

Note that the screenshots of the example ICSD 100 are illustrated and described in the context of an ICSD associated with an one or more entities that are pharmacies. However, this is not to be construed as limiting, and it is to be appreciated and understood that the techniques described herein are applicable to any umber and any type or types of entity or entities.

Referring to FIG. 4, here the ICSD 100 includes interactive SMN components 402, 404, and 406. Note that each SMN component can also be considered an CRT-LG component that corresponds with a logical grouping for individual scheduled and/or unscheduled CRT instances and corresponding CRT sets. More particularly, each of these MSN components is represented with text that corresponds with a particular entity, namely Pharmacy 1, Pharmacy 2, or Pharmacy 3. The ICSD 100 also includes a CTS navigation component 408 in the form of a navigation menu with possible selections.

Recall that like scheduled and/or unscheduled CRT instances and CRT sets, descriptive text and/or colors that represent an entity's compliance state can be attributed to individual ICSD components. Accordingly, here each of the SMN components 402, 404, and 406 are represented with a color and text (in the form of a number and percent symbol) that corresponds to its corresponding entity's compliance status.

For example, the SMN component 402 is represented as red, indicating that the overall current compliance status of Pharmacy 1 is non-compliant status. The SMN component 402 is also represented with text in the form of percentage numbers that indicates that 8 percent of the scheduled CRT instances associated with Pharmacy 1 are green and thus have a completed-compliant or currently-compliant status, 8 percent of the scheduled CRT instances associated with Pharmacy 1 are yellow and thus have a risk-compliant status, and 83 percent are red and thus have a non-compliant.

Recall that an ICSD user may navigate between hierarchical-related subject matter classifications (which in turn can be associated with CRT sets and CRT instances) by interacting with individual SMN components. Accordingly, in this example, assume that the ICSD user 202 interacts with the SMN component 402 by selecting (e.g., clicking) the SMN component 402 in order to learn more about the compliance status of Pharmacy 1.

Figure 5:
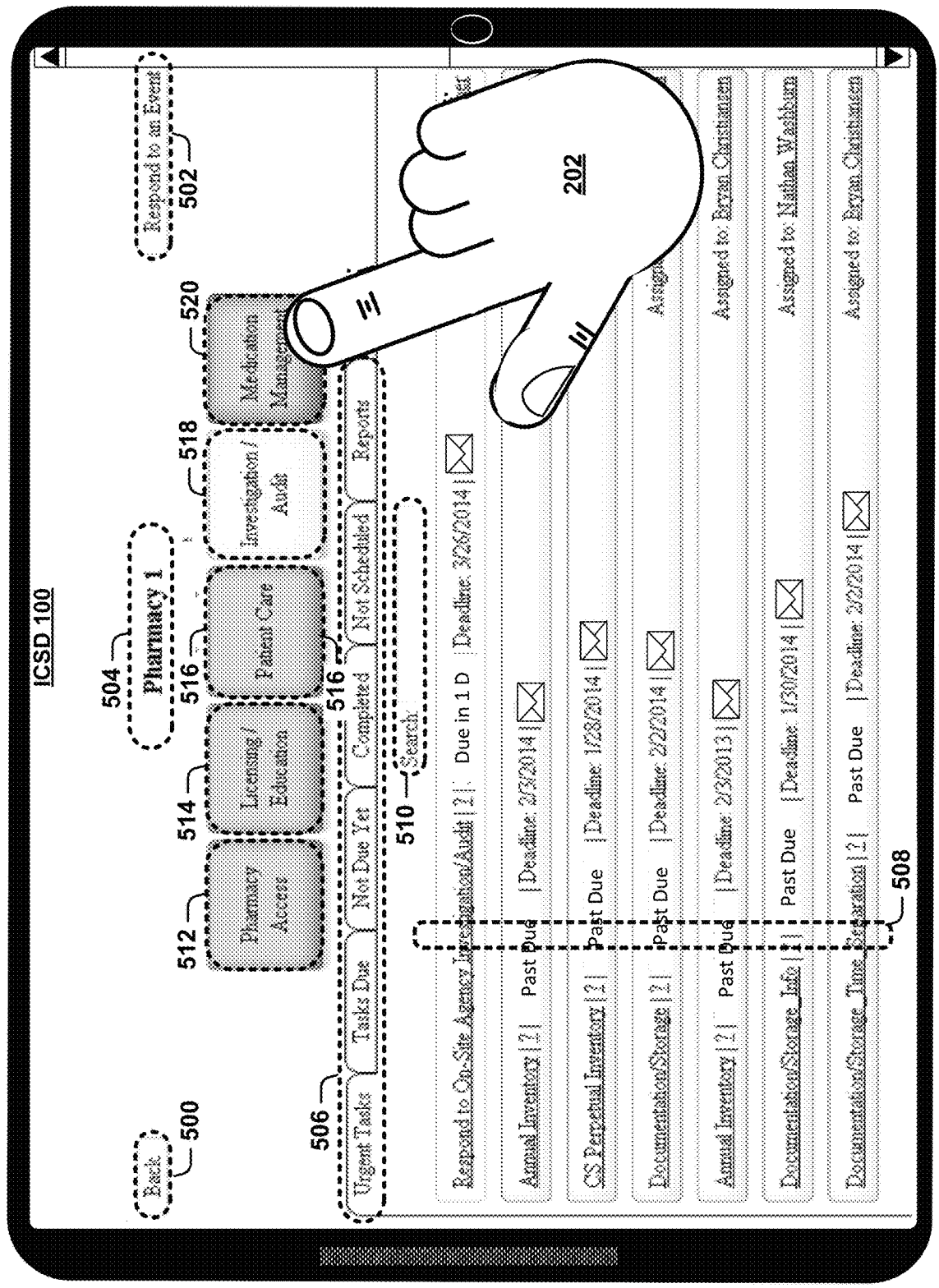

As a result of the ICSD user 202 selecting the SMN component 402, as shown in FIG. 5 the ICSD user 202 can be presented with a screen that further details the compliance status of Pharmacy 1. Said another way, the ICSD 100 includes further details about the compliance status of Pharmacy 1. More particularly, in this example the ICSD 100 includes multiple interactive ICSD components that can be utilized to navigate between various hierarchical subject matter classification levels.

For example, note that the ICSD 100 includes CTS navigational component 500 in the form of directional control, CTS navigational component 502 in the form of a CRT event wizard, and a CRT-LG component 504 that indicates that the logical grouping of the current hierarchical-related subject matter classification is "Pharmacy 1". ICSD 100 also includes multiple other CRT-LG components 506 in the form of individual tabs.

For example, here the Urgent Tasks tab is initially selected by default and provides a list of current scheduled CRT instances, as individual CRT instances 508, with a current status of risk-compliant or non-compliant. In other words, the individual associated CRT instances organized under the Urgent Tasks tab are either risk-compliant or non-compliant.

Note that here, the seven individual CRT instances 508 represent those CRT instances that are currently categorized as Urgent Tasks and that are currently hierarchically related to the hierarchical subject matter classifications Pharmacy Access, Licensing Education, Patient Care, Investigation/Audit, and Medication Management, as represented individual SMN components 512-520 under the classification Pharmacy 1.

Note that if the ICSD user 202 selected one of the CRT-LG components 506 other than the Urgent Tasks tab, such as the Tasks Due tab for instance, one or more other individual CRT instances might be presented in the ICSD 100 that were due to be completed. These other individual CRT instances might represent various individual scheduled CRT instances, such as any number and combination of completed-compliant, currently-compliant, risk-compliant, and/or non-compliant CRT instances for example.

With respect to the currently selected Urgent Tasks tab, note that the CRT instance Respond to On-Site Agency investigation/Audit is represented yellow indicating a current compliance state of risk-compliant. The other CRT instances listed under the Urgent Tasks tab are represented red indicating a current compliance state of non-compliant. To assist a ICSD user (e.g., the ICSD user 202) in finding one or more individual CRT instances, in this example the ICSD 100 includes a CRT search component 510.

The ICSD 100 also includes multiple individual SMN components 510-520 under the classification Pharmacy 1. Recall that an SMN component can be configured with descriptive text and/or one or more distinctive colors that represent the subject matter classification and/or sub-classification of that SMN component and/or the current compliance state of one or more CRT sets and/or scheduled CRT instances associated with that SMN. Accordingly, in this example note that each SMN component is represented in the ICSD 100 with text that represents its subject matter sub-classification and with a color that represents the current compliance state of its associated CRT sets and/or scheduled CRT instances.

For example, the SMN component 520 includes the text "Medication Management" that indicates that the SMN component 520 is hierarchically sub-classified as Medication Management. The MSN component 520 is represented as red indicating that the compliance state of its associated CRT sets and/or scheduled CRT instances is non-compliant (i.e., at least one associated CRT instance is non-compliant).

To illustrate the compliance state of the associated CRT sets and/or scheduled CRT instances of the SMN component 520, assume here that the ICSD user 202 selects the SMN component 520 in order to learn more about the compliance state of the CRT sets and/or scheduled CRT instances associated with the Medication Management hierarchical sub-classification.

Figure 6:
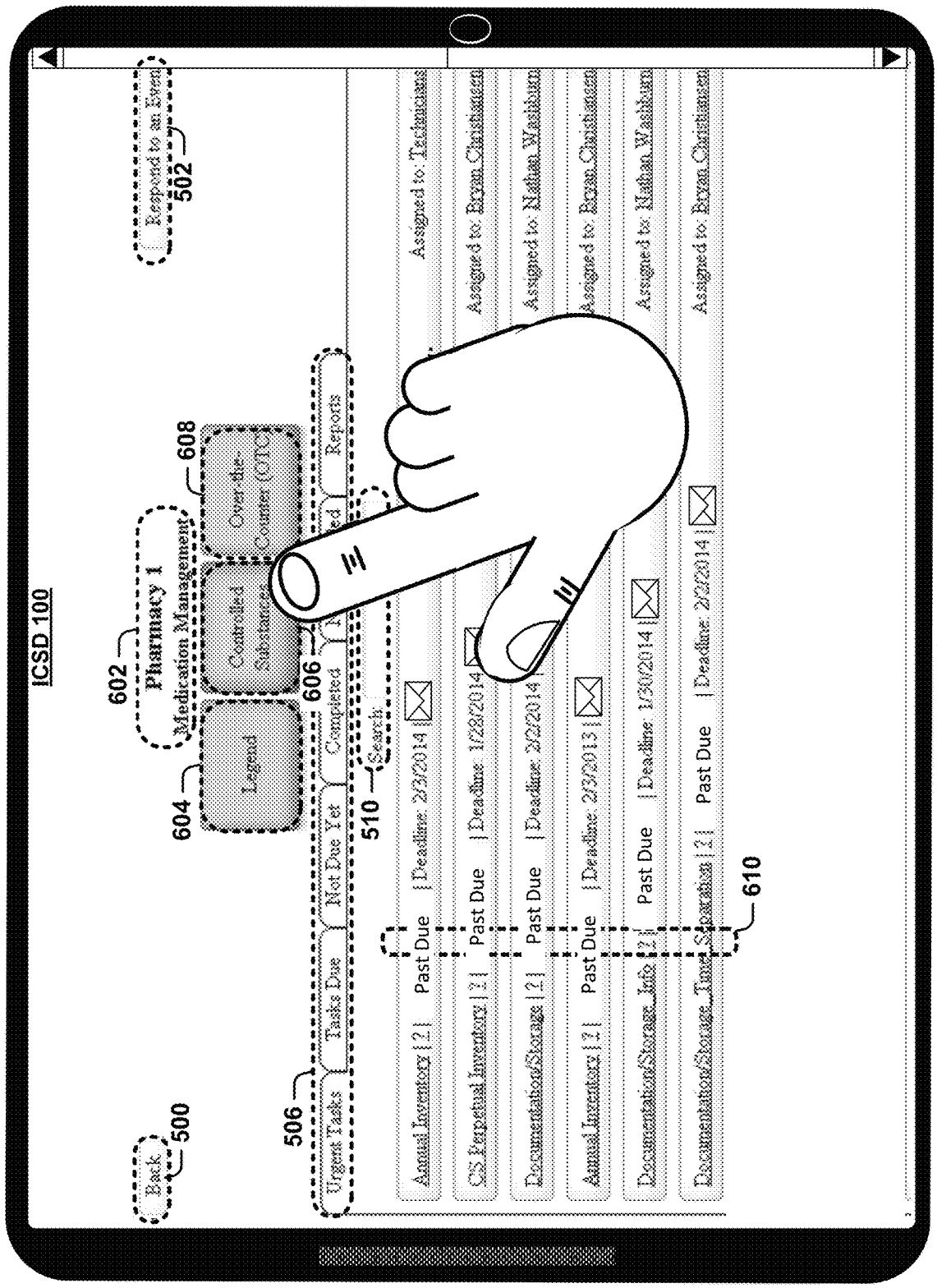

As a result of the ICSD user 202 selecting SMN component 520, as shown in FIG. 6 the ICSD user 202 can be presented with a screen that further details the compliance state of the Medication Management sub-classification under the classification Pharmacy 1. For example, note that the ICSD 100 now includes a CRT-LG component 602 that indicates that the logical grouping of the current hierarchically-related subject matter sub-classification Medication Management.

The ICSD 100 also includes multiple individual SMN components 604-608 under the sub-classification Medication Management. Note that each SMN component is represented in the ICSD 100 with text that represents its subject matter sub-classification and with a color that represents the current compliance state of its associated CRT sets and/or scheduled CRT instances.

For example, the SMN component 604 includes the text "Legend" that indicates that the SMN component 604 is hierarchically sub-classified under Medication Management as Legend. The MSN component 604 is represented as green indicating that the compliance state of its associated CRT sets and/or scheduled CRT instances is completed-compliant or currently-compliant status (i.e., there are no CRT associated instances that are risk-compliant or non-compliant).

As another example, the SMN component 606 includes the text "Controlled Substances" that indicates that the SMN component 606 is hierarchically sub-classified under Medication Management as Controlled Substances. The MSN component 602 is represented as red indicating that the compliance state of its associated CRT sets and/or scheduled CRT instances is non-compliant (i.e., at least one associated CRT instance is non-compliant).

Note that here the Urgent Tasks tab is initially selected by default and provides a list of current scheduled CRT instances, as individual CRT instances 610, with a current compliance state of non-compliant. In other words, the individual associated CRT instances organized under the Urgent Tasks tab are all non-compliant.

Also note that here, the six individual CRT instances 610 represent those CRT instances that are currently categorized as Urgent Tasks and that are currently hierarchically related to the hierarchical subject matter classifications Legend, Controlled Substances, and Over-the-Counter OTC), as represented individual SMN components 604-608 under the sub-classification Medication Management.

Note that the yellow CRT instance Respond to On-Site Agency investigation/Audit is hierarchically associated with the Investigation Audit SMN component 518 and the Investigation Audit hierarchical sub-classification. The CRT instance Respond to On-Site Agency investigation/Audit is not hierarchically associated with the Medication Management sub-classification, and is thus not represented here.

To illustrate the compliance state of the associated CRT sets and/or scheduled CRT instances of the SMN component 606, assume here that the ICSD user 202 selects the SMN component 606 in order to learn more about the compliance state of the CRT sets and/or scheduled CRT instances associated with the Controlled Substances hierarchical sub-classification.

Figure 7:
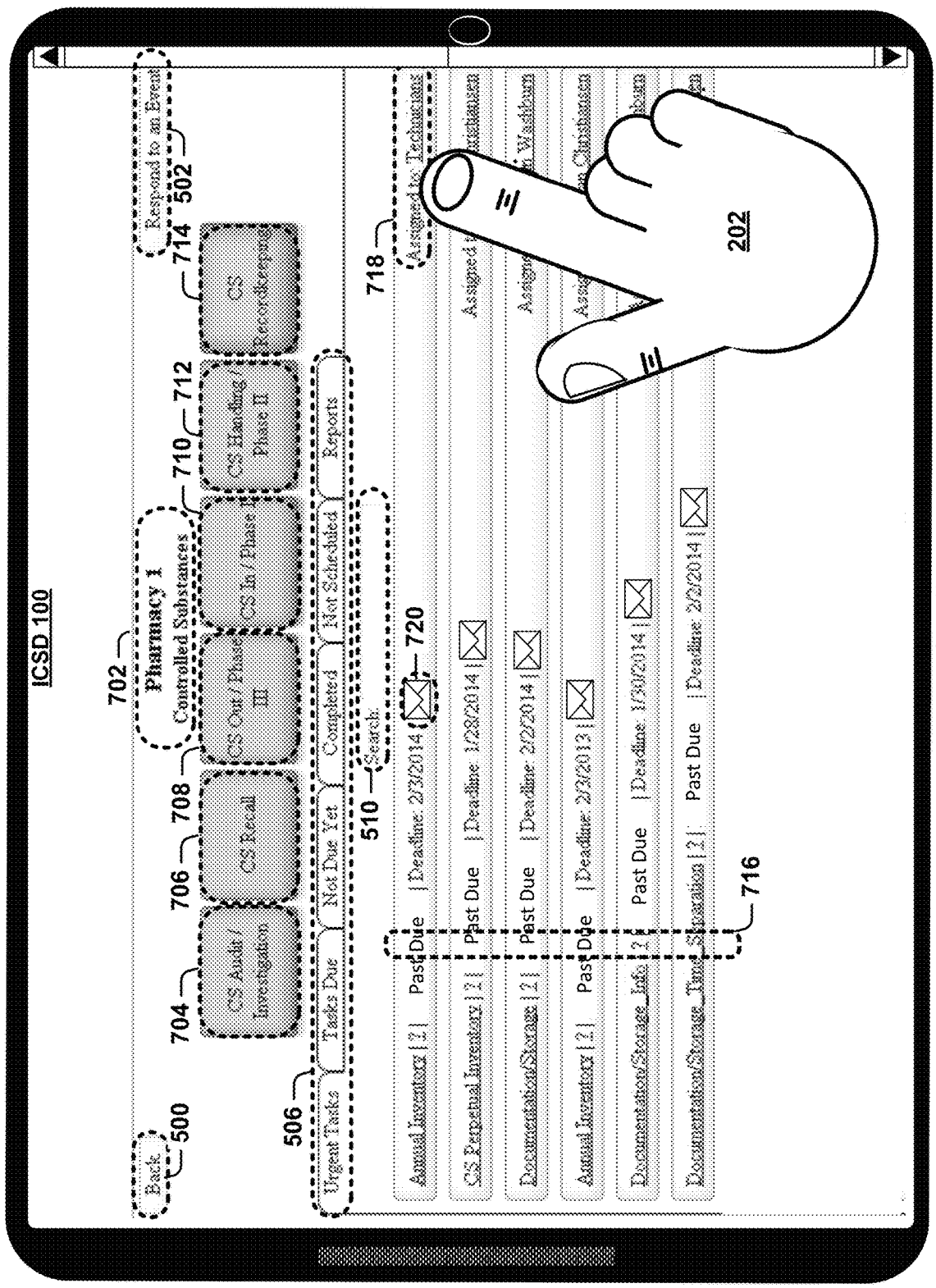

As a result of the ICSD user 202 selecting SMN component 606, as shown in FIG. 7 the ICSD user 202 can be presented with a screen that further details the compliance state of the Controlled Substances sub-classification under the classification Pharmacy 1 and sub-classification Medication Management. For example, note that the ICSD 100 now includes a CRT-LG component 702 that indicates that the logical grouping of the current hierarchically-related subject matter sub-classification Controlled Substances.

The ICSD 100 also includes multiple individual SMN components 704-714 under the sub-classification Controlled Substances. Note that each SMN component is represented in the ICSD 100 with text that represents its subject matter sub-classification and with a color that represents the current compliance state of its associated CRT sets and/or scheduled CRT instances.

For example, the SMN component 714 includes the text "CS Recordkeeping" that indicates that it is hierarchically sub-classified under Medication Management as CS Recordkeeping. The MSN component 714 is represented as red indicating that the compliance state of its associated CRT sets and/or scheduled CRT instances is non-compliant (i.e., at least one associated CRT instance is non-compliant).

Note that here, the six individual CRT instances 716 represent those CRT instances that are currently categorized as Urgent Tasks and that are currently hierarchically related to the hierarchical subject matter classifications represented by the SMN components 704-714 under the sub-classification Controlled Substances.

Recall that, as described above, individual CRT instances can correspond with individual scheduled and/or unscheduled CRT instances and be configured and utilized to interact with a particular CRT instance, such as to view and/or change the underlying CRT's contents, automatically sending a message about the instance's compliance state, and/or assigning and reassigning and reassigning that instance to another ICSD user.

To provide the reader with a practical example, assume here that the CRT instance assignment component 718 for the CRT instance Annual Inventory is configured to allow a CTS to easily and conveniently assign and/or reassign the CRT instance Annual Inventory to another ICSD user and/or ICSD user group. Also assume that the ICSD user 202 thus interacts with the CRT instance assignment component 718 by selecting (e.g., clicking) it. As a result, and as shown in FIG. 8, the CRT instance assignment component 718 is now expanded (i.e., represented in an expanded form in the ICSD 100) to allow the ICSD user 202 to easily determine that currently, the CRT instance Annual Inventory (with the deadline of Feb. 3, 2014) is assigned to the ICSD user group Technicians.

Figure 8:
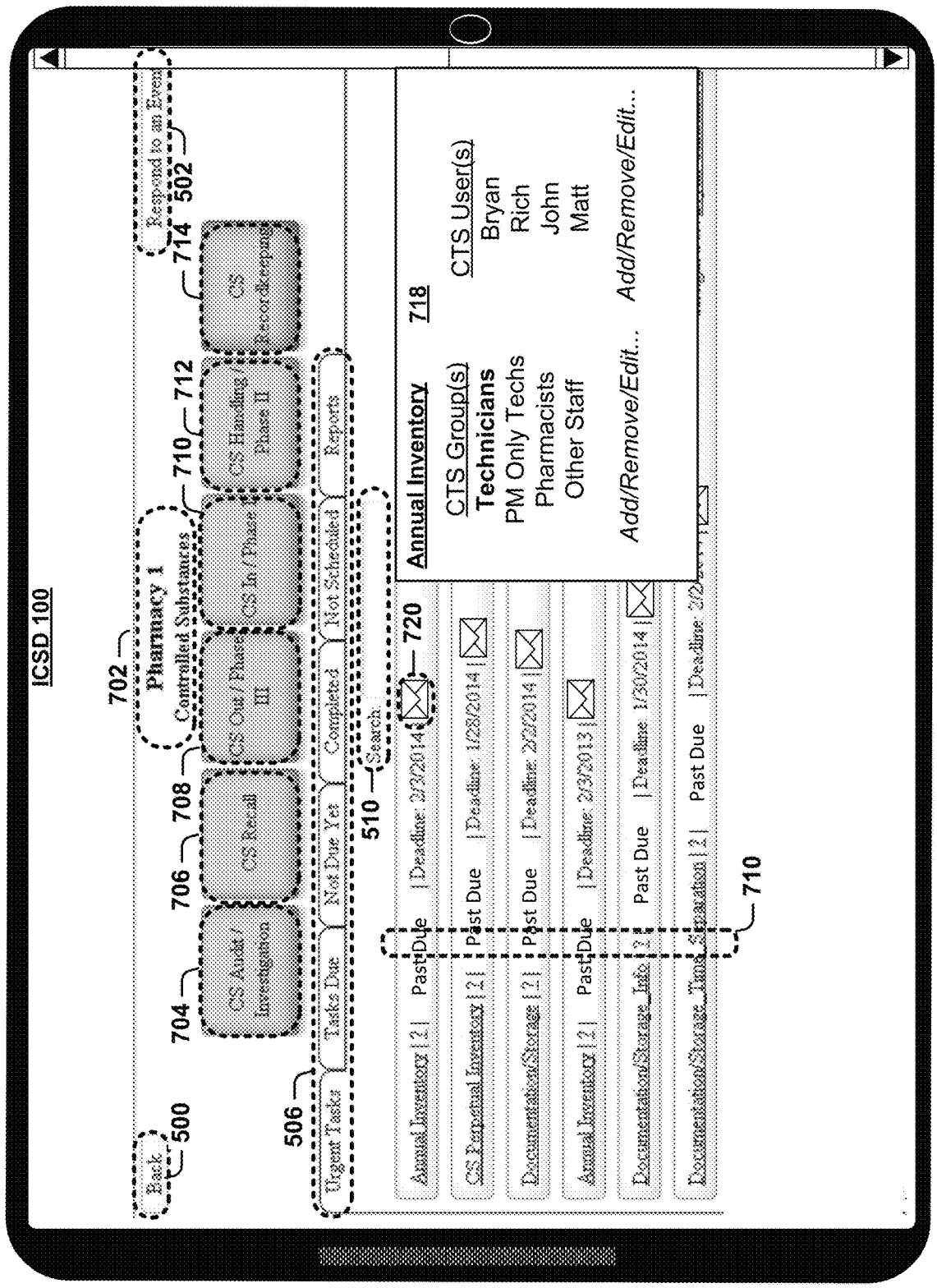

Note that in the example illustrated in FIG. 8, if desired the ICSD user 202 can interact with the CRT instance assignment component 718 to change the current assignment of the CRT instance Annual Inventory. For instance, the ICSD user might assign the CRT instance Annual Inventory to an additional ICSD user group and/or ICSD user (e.g., to Matt) and/or un-assign this CRT instance to the ICSD user group Technicians. As shown, the ICSD user might also add, remove, and/or edit a ICSD user group(s) or ICSD user via the CRT instance assignment component 718.

To provide the reader with another practical example, assume that in FIG. 7 the CRT messaging component 720 for the CRT instance Annual Inventory is configured to allow a CTS to easily and conveniently send a message to one or more individuals and/or groups (e.g. ICSD user(s), ICSD user group(s), non-ICSD users, etc.) about the compliance state of the CRT instance Annual Inventory. As noted above, a message might be a text message, instant message, electronic mail (email), or the like.

Accordingly, assume that the ICSD user 202 thus interacts with the CRT messaging component 720 to send such a message by selecting (e.g., clicking) it. As a result, and as shown in FIG. 9, the CRT messaging component 720 is now expanded to allow the ICSD user 202 to easily determine whom to send the message and to determine the content of the message.

Figure 9:
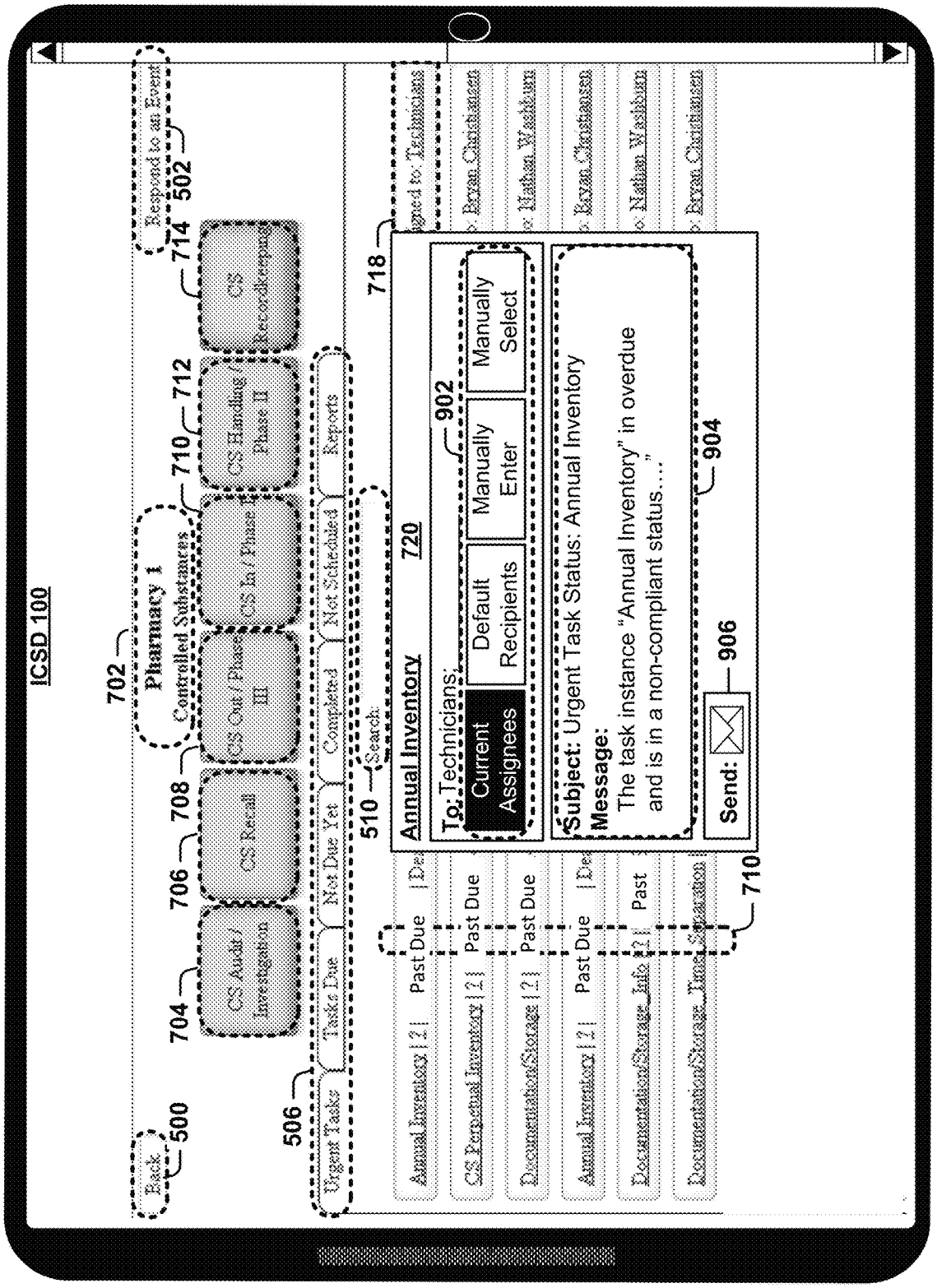

Note that in the example illustrated in FIG. 9, for convenience the CRT messaging component 720 includes selection boxes 902 to allow the ICSD user 202 to easily select the recipient(s) of the message (with current assignees selected by default). Additionally, the CRT messaging component 720 includes a message content editing window 904 with a default message. In at least one embodiment, the CRT messaging component 720 can be configured to allow the ICSD user 202 to edit the default message content if desired. Alternatively, the ICSD user can simply decide to leave the default message content as the message to send. In this example, the CRT messaging component 720 also includes a send message control 906 to allow the ICSD user 202 to easily and conveniently send the message to the intended recipients by simply selecting (e.g., clicking) it.

Note that in FIGS. 5-8 illustrated and described above, individual CRT instances logically associated with the Urgent Tasks tab, and that thus represent individual CRT instances having a current compliance state of risk-compliant (i.e., yellow) or non-compliant (i.e., red) have been illustrated. Referring back to FIG. 5, to provide the reader with an example of individual CRT instances that represent individual CRT instances with a current compliance state of completed-compliant and/or currently-compliant (green), assume that the ICSD user 202 selects the Not Done Yet tab of the CRT-LG components 506.

Figure 10:
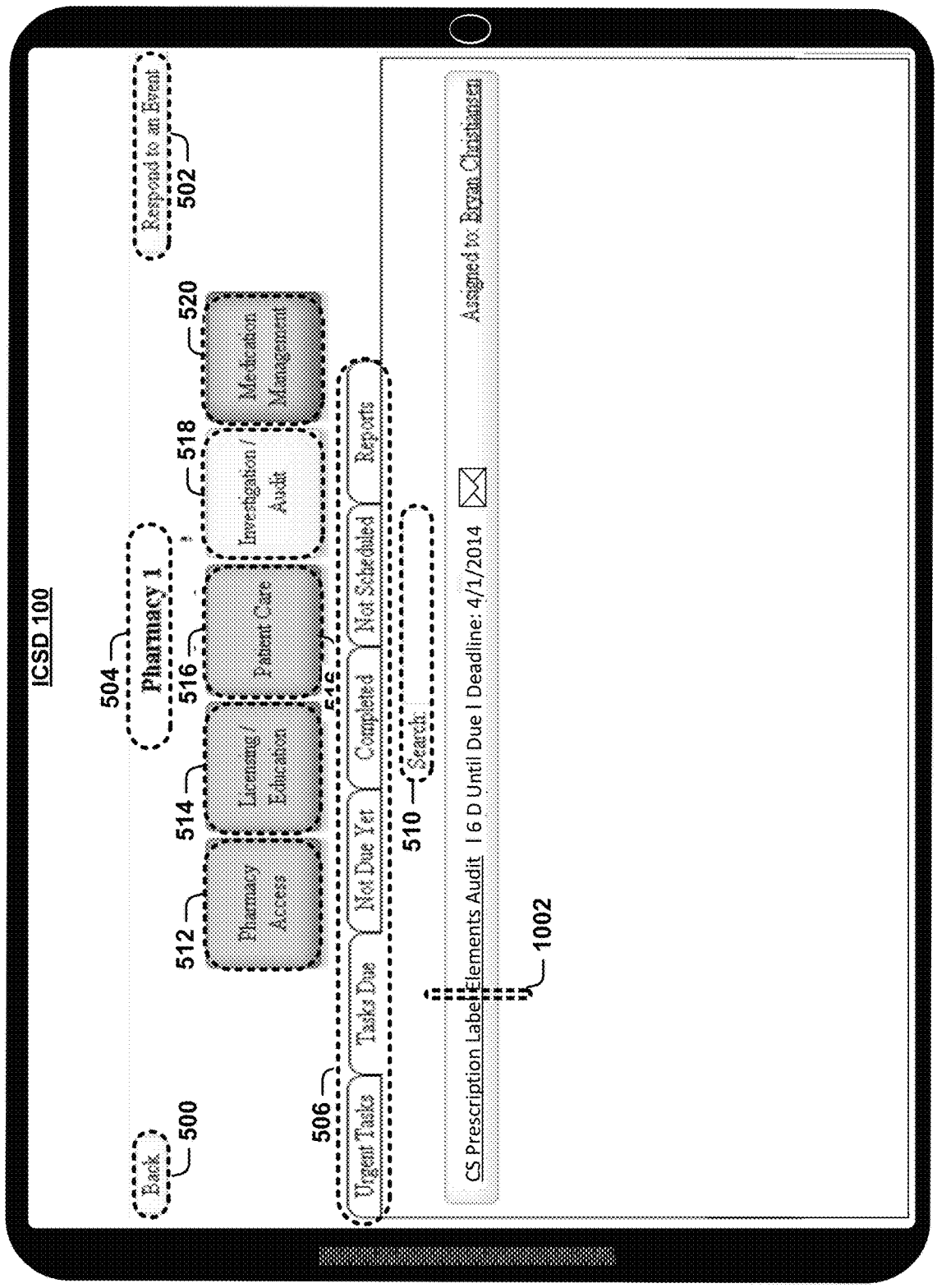

As a result of the ICSD user 202 selecting the Not Done Yet tab, as shown in FIG. 10 the ICSD user 202 can be presented with a screen that includes a CRT instance 1002 that represents the individual CRT instance CS Prescription Label Elements Audit. Here, the CRT instance CS Prescription Label Elements Audit has a currently-compliant CRT instance, and is thus presented as green. Said another way, the ICSD 100 includes the CRT instance 1002 for the currently-compliant CS Prescription Label Elements Audit CRT instance. As with other CRT instances, the CRT instance 1002 can be configured and utilized to allow a ICSD user (e.g., the ICSD user 202) to interact with the CS Prescription Label Elements Audit CRT instance.

Example Compliance Management Technique or Method

To facilitate the readers' understanding, FIG. 11 illustrates an example flowchart of a process, technique, or method 1100 that is consistent with at least one implementation of the described compliance management techniques. For ease of discussion, the process, technique, or method 1100 will be described in the context of a CTS, as described herein. However, it is to be appreciated and understood that this process, technique, or method is not necessarily limited to the CTS described herein, and any type of suitable data compliance tools may be implemented and utilized in accordance with the described techniques.

Note that the order in which the blocks of process, technique, or method 1100 are described is not intended to be construed as a limitation and any number of the described blocks or acts can be combined in any order and performed any number of times.

Furthermore, the process, technique, or method 1100 can be implemented in any suitable hardware, software, firmware, or combination thereof such that one or more computing devices can implement the process, technique, or method 1100 and/or cause the process, technique, or method 1100 to be implemented.

In at least one circumstance for instance, the process, technique, or method 1100 can be stored on one or more computer-readable storage media as a set of computer-readable instructions that, when executed on a computing device(s), causes all or part of the process, technique, or method 1100 to be performed.

Referring to process, technique, or method 1100, at block 1102 an entity's current compliance status can be tracked and presented via an ICSD, such as the example ICSD 100 illustrated and described above. In at least one embodiment, the ICSD can be included in a CTS of various compliance tools, such as those described above, that can be configured and utilized in accordance with the described techniques to effectively operationalize the entity's compliance resources.

Block 1102 can be accomplished in any suitable way. For example, in accordance with at least one embodiment, the process, technique, or method 1200 illustrated in FIG. 12 and described below can be utilized to accomplish block 1102. Note that the order in which the blocks of process, technique, or method 200 are described is not intended to be construed as a limitation, and any number of the described blocks or acts can be combined in any order and performed any number of times.

Furthermore, process, technique, or method 1200 can be implemented in any suitable hardware, software, firmware, or combination thereof such that one or more computing devices can implement the process, technique, or method 1200 and/or cause the process, technique, or method 1200 to be implemented.

In at least one circumstance for instance, the process, technique, or method 1200 can be stored on one or more computer-readable storage media as a set of computer-readable instructions that, when executed on a computing device(s), causes all or part of the process, technique, or method 200 to be performed.

Referring now to FIG. 12, at block 1202 CRT instances provided via the ICSD can be assigned to one or more corresponding ICSD users and/or ICSD user groups. Recall that in at least one embodiment, the CTS edit tool and/or a CRT assignment component can be configured and utilized to allow a ICSD user with sufficient privileges to assign (e.g., schedule) and/or re-assign CRT instances via the ICSD. Also recall that the ICSD can be configured to limit the completion of a CRT instance to one or more particular ICSD users and/or ICSD user groups that have been assigned to that CRT instance.

At block 1204, the current compliance state of the assigned CRT instances can be tracked and documented by the ICSD. As explained below, in at least one embodiment the ICSD can be configured and utilized to track the completion or partial completion of individual CRT elements of a CRT instance in order to determine the completion status of that CRT instance. In other words, in at least one embodiment the ICSD can be configured and utilized to track the completion status of a CRT. This completion status and the CRT instance's deadline can then be utilized by the ICSD to determine the CRT instance's current compliance state.

At block 1206, interactive ICSD components associated with the CRT instances can be presented in the ICSD to represent the current compliance status of the entity. These ICSD components can include one or more of the assigned CRT instances and/or other ICSD components, such as SMN components for instance.

In at least one embodiment for instance, the current compliance status of the entity can be presented in the ICSD by SMN components such that the current compliance state of various hierarchically organized navigable groupings of interactive ICSD components is displayed.

More particularly, recall that assigned CRT instances can be grouped together in a CRT set and/or hierarchically related to one another based upon one or more characteristics that each assigned CRT instance in that CRT set have in common with one another. Individual CRT sets can be grouped together in any number of parent CRT sets and/or hierarchically related to one another based upon one or more characteristics that each child CRT set in that parent set have in common with one another.

Furthermore, individual CRT sets can be presented in the ICSD as individual navigable SMN components that can be presented in the ICSD to represent the current compliance state of one or more associated CRT instances. These SMN components can be utilized by ICSD users to navigate between hierarchically related subject matter classifications of other associated CRT sets and/or CRT instances.

Referring back to FIG. 11, once the current compliance state of the entity is tracked and presented via the ICSD, at block 1104 an ICSD user interaction associated with the entity's current compliance status can be received via the ICSD. For example, the ICSD user interaction might be the completion or partial completion of a CRT instance. More particularly, recall that the ICSD can be configured and utilized to interactively guide ICSD users assigned to a CRT instance through the completion, or partial completion of that CRT instances. As another example, the ICSD user interaction might be the scheduling of an unscheduled CRT instance.

As another example, alternatively or additionally the ICSD user interaction might be another type of interaction, such as a modification of a CRT attribute (e.g., changing a CRT instance's deadline and/or CRT element and/or sub-element), addition or deletion of a CRT element and/or sub-element, creation of a CRT instance, or the like.

At block 1106, in response to the ICSD user interaction, the current compliance status of the entity can be updated. This can be accomplished in any suitable way. For example, as described above, the ICSD can be configured and utilized to track the current compliance state of each assigned CRT instance.

Accordingly, once the completion status, CRT attribute, and/or current date/time changes, the ICSD can update and change the current compliance state of each assigned CRT instance. In some circumstances, neither the completion status or CRT attribute might change in response to the ICSD user interaction. For example, the ICSD user might not fully complete a CRT instance and/or might not interact with the ICSD in a manner that changes a completion status or CRT attribute (e.g., the ICSD user might simply login and interact with one or more ICSD components without affecting a completion status or CRT attribute. In such circumstances, the current compliance status of the entity might simply be updated by the ICSD to reflect a more current date and/or time (e.g., the current date and/or time at the time of the update).

At block 1108, the ICSD user interaction and updated current compliance status at blocks 1104 and 1106 can be documented such that a complete audit trail can be retrieved and reviewed if desired. This can be accomplished in any suitable way. For example, as noted above the CTS can include a CTS audit tool that can be utilized by the ICSD to track and document individual ICSD user activities, including ICSD user interactions with CRT instances such as the completion or partial completion of a CRT instance for example. As explained above, any number of CRT instances can be created, completed and tracked for a corresponding CRT by utilizing functionality of the ICSD.

As FIG. 11 illustrates, blocks 1102-1108 can be repeated any number of times. For example, once the current compliance status has been updated at block 1106 and the ICSD user interaction and updated compliance status has been documented at block 1108, the entity's updated current compliance status (i.e., now the entity's current compliance status) can be tracked and presented via the ICSD at block 1102.

Example Framework or System

The compliance management techniques described herein can be implemented in any suitable way. For example, in at least one embodiment, these techniques can be implemented in a framework or system that is associated with one or more computing devices. Accordingly, to facilitate the readers' understanding of such a framework or system, FIG. 13 illustrates an example compliance management framework or system 1300 in which these techniques can be implemented.

More particularly, the compliance management framework or system 1300 in this example includes multiple computing devices, represented here as computing devices 1302 and 1304. These computing devices can function in a stand-alone or cooperative manner to implement the described compliance management techniques.

Note that here, computing device 1302 is shown embodied as a tablet mobile computing device. Computing device 1304, in turn, is shown embodied as a server computing device. However, this is not intended to be limiting, and it is to be appreciated and understood that the computer-implemented credibility system 1300 can include any number and type(s) of computing devices.

In this regard, the term "computing device", as used herein, can mean any type of device or devices having some amount of computer processing capability. Examples of computing devices can include personal computers (desktop, portable laptop, etc.), mobile/cellular phones, smart phones, tablets, laptops, tablets, personal digital assistants, and/or any of various ever-evolving or yet to be developed types of computing devices.

In this example, computing devices 1302 and 1304 can indirectly and/or directly exchange data via one or more network(s) 1306 and/or by any other suitable means, such as via external storage 1308 for instance. Without limitation, network(s) 1306 can include one or more local area networks (LANs), wide area networks (WANs), the Internet, and/or the like. Examples of external storage 1308 can include optical storage devices (e.g., CDs, DVDs etc.) and flash storage devices (e.g., memory sticks or memory cards), or the like.

Additionally or alternatively, computing devices 1302 and/or 1304 can exchange data with other resources associated with the cloud 1310, for example via network(s) 1306. As used herein, the cloud 1310 refers to computing-related resources/functionalities that can be accessed via network(s) 1306, although the location of these distributed computing resources and functionalities may not be readily apparent.

Here, computing devices 1302 and 1304 can each include a processor(s) (i.e., central processing unit(s)) and storage. More particularly, here computing device 1302 includes processor(s) 1312 and storage 1314. Similarly, computing device 1304 includes processor(s) 1316 and storage 1318. Processor(s) 1312 and 1316 can execute data in the form of computer-readable instructions to provide the functionality described herein.

Data, such as computer-readable instructions, can be stored on storage 1314 and/or 1318. Storage 1314 and/or 1318 can include one or more of volatile or non-volatile memory, hard drives, optical storage devices (e.g., CDs, DVDs etc.), or the like.

Devices 1302 and 1304 can also be configured to receive and/or generate data in the form of computer-readable instructions from one or more other storages, such as the external storage 1308 for instance. These computing devices may also receive data in the form of computer-readable instructions over the network(s) 1306 that are then stored on the computing device(s) for execution by the processor(s).

As used herein, the term "computer-readable media" can include transitory and non-transitory instructions. In contrast, the term "computer-readable storage media" excludes transitory instances. Computer-readable storage media can include one or more "computer-readable storage devices". Examples of computer-readable storage devices include volatile storage media, such as RAM, and non-volatile storage media, such as hard drives, optical discs, flash memory, and the like.

Note that in this example, computing device 1302 is shown as being configured to implement at least part of a CTS 1320 (i.e. as CTS 1320(1)). In this example, the CTS 1320 can include at least part of an ICSD 1322 (i.e. as ICSD 1322(1)), CTS audit tool 1324 (i.e. as CTS audit tool 1324(1)), CTS edit tool 1326 (i.e. as CTS edit tool 1326(1)), CRT wizard 1328 (i.e. as CRT wizard 1328 (1)), and CTS training tool 1330 (i.e. as CTS training tool 1330(1)).

Computing device 1304, in turn, is also shown as being configured to implement at least part of the CTS 1320 (i.e. as CTS 1320(2)) that can include at least part of the ICSD 1322 (i.e. as ICSD tool 1322(2)), CTS audit tool 1324 (i.e. as CTS audit tool 1324(2)), CTS edit tool 1326 (i.e. as CTS edit tool 1326(2)), CRT wizard 1328 (i.e. as CRT wizard 1328(2)), and CTS training tool 1330 (i.e. as CTS training tool 1330(2)).

Additionally, at least part of the CTS 1320 is shown in this example as being implementable by one or more distributed computing resources of the cloud 1210 (i.e. as CTS 1320 (3)). Note that CTS 1320(3) can include at least part of the ICSD 1322 (i.e. as ICSD tool 1322(3)), CTS audit tool 1324 (i.e. as CTS audit tool 1224(3)), CTS edit tool 1326 (i.e. as CTS edit tool 1326(3)), CRT wizard 1328 (i.e. as CRT wizard 1328(3)), and CTS training tool 1330 (i.e. as CTS training tool 1330(3)).

The invention claimed is:
1. A method comprising:
tracking and presenting an entity's current compliance status via an interactive compliance status dashboard (ICSD), wherein tracking and presenting the entity's current compliance status comprises presenting at least one compliance related task (CRT) logical grouping component via the ICSD, wherein the at least one CRT logical grouping component comprises a parent set of a plurality of CRT instances and at least one other CRT logical grouping component comprising a child set of one or more of the plurality of CRT instances; wherein the at least one other CRT logical grouping component is not presented via the ICSD;
receiving a first user interaction with the at least one CRT logical grouping component via the ICSD;
responsive to receiving the first user interaction:
  determining a current compliance state of at least one CRT instance of the plurality of CRT instances, wherein determining the current compliance state of the at least one CRT instance is based on a completion status of the at least one CRT instance, a deadline for completion for the at least one CRT instance, and a current date;
  presenting the at least one other CRT logical grouping component and the at least one CRT instance via the ICSD in a first color based on the current compliance state of the at least one CRT instance;
  determining a percentage number for the at least one other CRT logical grouping component based on a quantity of individual CRT instances of the plurality of CRT instances; and
  presenting the percentage number with the at least one other CRT logical grouping component via the ICSD;
receiving a second user interaction with at least one CRT instance element of the at least one CRT instance via the ICSD;
responsive to receiving the second user interaction:
  interactively guiding an ICSD user through partial completion of the at least one CRT instance, wherein partial completion of the at least one CRT instance comprises completion of at least one CRT sub-element of the at least one CRT instance element;
  documenting the completion of at least one CRT sub-element of the at least one CRT instance element; and
  updating the entity's current compliance status; and
tracking and presenting the entity's updated current compliance status via the ICSD, wherein tracking and presenting the entity's updated current compliance status comprises:
  determining an updated current compliance state of the at least one CRT instance, wherein determining the updated current compliance state of the at least one CRT instance is based on an updated completion status of the at least one CRT instance, the deadline for completion for the at least one CRT instance, and an updated current date;
  presenting the at least one other CRT logical grouping component and the at least one CRT instance via the ICSD in the first color or a second color based on the updated current compliance state of the at least one CRT instance;
  determining an updated percentage number for the at least one other CRT logical grouping component based on an updated quantity of individual CRT instances of the plurality of CRT instances; and presenting the updated percentage with the at least one other CRT logical grouping component via the ICSD.

2. The method of claim 1, wherein tracking and presenting the entity's current compliance status further comprises assigning the at least one CRT instance to one or both of:
the ICSD user; or
at least one ICSD user group comprising the ICSD user.

3. The method of claim 1, further comprising responsive to receiving the second user interaction, reassigning the at least one CRT instance to the ICSD user or at least one ICSD user group comprising the ICSD user.

4. The method of claim 1, wherein tracking and presenting the entity's current compliance status further comprises presenting the at least one CRT logical grouping component via the ICSD in the second color or another color based on the updated current compliance state of the at least one CRT instance, wherein the at least one CRT logical grouping component corresponds to a logical grouping comprising the at least one other CRT logical grouping component and one or more other CRT logical grouping components.

5. The method of claim the method of claim 1, responsive to receiving the second user interaction further comprising scheduling at least one other CRT instance.

6. The method of claim 1, further comprising documenting the second user interaction and the entity's updated current compliance status.

7. One or more computer-readable storage media having instructions stored thereon that, when executed by a computing device, cause the computing device to perform acts comprising:
assigning at least one compliance related task (CRT) instance of a plurality of CRT instances to an interactive compliance status dashboard (ICSD) user;
presenting at least one navigational component via the ICSD comprising a parent set of the plurality of CRT instances and at least one other navigational component comprising a child set of one or more of the plurality of CRT instances, wherein the at least one other navigational component is not presented via the ICSD;
receiving a first user interaction with the at least one navigational component via the ICSD;
responsive to receiving the first user interaction:
determining a current compliance state of the least one CRT instance based on a completion status of the at least one CRT instance and a deadline for completion for the at least one CRT instance;
presenting the at least one other navigational component and the at least one CRT instance via the ICSD, wherein the at least one CRT instance is presented in a first color based on the current compliance state of the at least one CRT instance;
determining a percentage number for the at least one other navigational component based on a quantity of individual compliant CRT instances of the plurality of CRT instances; and
presenting the percentage number with the at least one other navigational component via the ICSD;
receiving a second user interaction with a first CRT instance element of a plurality of CRT instance elements of the at least one CRT instance;
responsive to receiving the second user interaction:
interactively guiding the ICSD user through partial completion of the at least one CRT instance, wherein partial completion of the at least one CRT instance comprises completion of at least one CRT sub-element of the first CRT instance element; and
documenting the completion of the at least one CRT sub-element;
tracking the current compliance state of the at least one CRT instance, wherein tracking the current compliance state comprises:
responsive to receiving the second user interaction, determining a completion status of not complete for the at least one CRT instance; and
determining the current compliance state based on the completion status of not complete and the deadline for completion for the at least one CRT instance; and
receiving a third user interaction with a second CRT instance element of the plurality of CRT instance elements;
responsive to receiving the third user interaction:
interactively guiding the ICSD user through completion of the at least one CRT instance, wherein completion of the at least one CRT instance comprises completion of at least one other CRT sub-element of the first CRT instance element; and
documenting the completion of the at least one other CRT sub-element;
tracking an updated current compliance state of the at least one CRT instance, wherein tracking the updated current compliance state comprises:
responsive to receiving the third user interaction, determining an updated completion status of complete for the at least one CRT instance; and
determining the updated current compliance state based on the completion status of complete and the deadline for completion for the at least one CRT instance; and
presenting the at least one CRT instance via the ICSD in a second color representing the updated current compliance state.

8. The one or more computer-readable storage media of claim 7, further comprising presenting the at least one navigational component via the ICSD in the first color based on one or more other current compliance states of one or more other CRT instances of the plurality of CRT instances.

9. The one or more computer-readable storage media of claim 8, wherein the at least one navigational component comprises a subject matter navigation component with descriptive text.

10. The one or more computer-readable storage media of claim 7, further comprising documenting the first user interaction, the second user interaction, and the third user interaction.

11. The one or more computer-readable storage media of claim 7, further comprising utilizing a CRT wizard to facilitate identification of the at least one CRT instance by the ICSD user.

12. A system comprising:
one or more computing devices;
a compliance tool set (CTS) configured to:
track and present an entity's current compliance status via an interactive compliance status dashboard (ICSD), wherein to track and present the entity's current compliance status comprises presenting at least one compliance related task (CRT) logical grouping component via the ICSD, wherein the at least one CRT logical grouping component comprises a parent set of a plurality of CRT instances and at least one other CRT logical grouping component comprising a child set of one or more of the plurality of CRT instances; wherein the at least one other CRT logical grouping component is not presented via the ICSD;
receive a first user interaction with the at least one CRT logical grouping component via the ICSD;
responsive to receiving the first user interaction:
- determine a current compliance state of at least one CRT instance of the plurality of CRT instances, wherein to determine the current compliance state of the at least one CRT instance is based on a completion status of the at least one CRT instance, a deadline for completion for the at least one CRT instance, and a current date;
- present the at least one other CRT logical grouping component and the at least one CRT instance via the ICSD in a first color based on the current compliance state of the at least one CRT instance;
- determine a percentage number for the at least one other CRT logical grouping component based on a quantity of individual CRT instances of the plurality of CRT instances; and
- present the percentage number with the at least one other CRT logical grouping component via the ICSD;

receive a second user interaction with at least one CRT instance element of the at least one CRT instance via the ICSD;
responsive to receiving the second user interaction:
- interactively guide an ICSD user through partial completion of the at least one CRT instance, wherein partial completion of the at least one CRT instance comprises completion of at least one CRT sub-element of the at least one CRT instance element;
- document the completion of at least one CRT sub-element of the at least one CRT instance element; and
- update the entity's current compliance status; and track and present the entity's updated current compliance status via the ICSD, wherein to track and present the entity's updated current compliance status comprises:
- determining an updated current compliance state of the at least one CRT instance, wherein determining the updated current compliance state of the at least one CRT instance is based on an updated completion status of the at least one CRT instance, the deadline for completion for the at least one CRT instance, and an updated current date;
- presenting the at least one other CRT logical grouping component and the at least one CRT instance via the ICSD in the first color or a second color based on the updated current compliance state of the at least one CRT instance;
- determining an updated percentage number for the at least one other CRT logical grouping component based on an updated quantity of individual CRT instances of the plurality of CRT instances; and
- presenting the updated percentage with the at least one other CRT logical grouping component via the ICSD.

13. The system of claim 12, wherein to track and present the entity's current compliance status further comprises assigning the at least one CRT instance to one or both of:
- the ICSD user; or
- at least one ICSD user group comprising the ICSD user.

14. The system of claim 12, wherein the CTS is further configured to responsive to receiving the second user interaction, reassign the at least one CRT instance to the ICSD user or at least one ICSD user group comprising the ICSD user.

15. The system of claim 12, wherein to track and present the entity's current compliance status further comprises presenting the at least one CRT logical grouping component via the ICSD in the second color or another color based on the updated current compliance state of the at least one CRT instance, wherein the at least one CRT logical grouping component corresponds to a logical grouping comprising the at least one other CRT logical grouping component and one or more other CRT logical grouping components.

16. The system of claim 12, wherein the CTS is further configured to responsive to receiving the second user interaction, schedule at least one other CRT instance.

17. The system of claim 12, wherein the CTS is further configured to document the second user interaction and the entity's updated current compliance status.

* * * * *